(12) United States Patent
Bertocchi

(10) Patent No.: US 10,524,494 B2
(45) Date of Patent: Jan. 7, 2020

(54) METHOD AND A MACHINE FOR PRODUCING PUREE, OR JUICE, FROM FOOD PRODUCTS WITH HIGH PRODUCTION CAPACITY

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 1212 days.

(21) Appl. No.: 14/370,307

(22) PCT Filed: Jan. 3, 2013

(86) PCT No.: PCT/IB2013/050067
§ 371 (c)(1),
(2) Date: Jul. 2, 2014

(87) PCT Pub. No.: WO2013/102874
PCT Pub. Date: Jul. 11, 2013

(65) Prior Publication Data
US 2014/0373736 A1   Dec. 25, 2014

(30) Foreign Application Priority Data

Jan. 4, 2012 (IT) .................................. 2012A0001

(51) Int. Cl.
*A23G 3/34* (2006.01)
*A23N 1/02* (2006.01)
*A22C 17/00* (2006.01)

(52) U.S. Cl.
CPC ............ *A23N 1/02* (2013.01); *A22C 17/0026* (2013.01)

(58) Field of Classification Search
None
See application file for complete search history.

(56) References Cited

U.S. PATENT DOCUMENTS

| 2,558,799 A | 7/1951 | Thomas |
| 3,559,706 A * | 2/1971 | Conrad .................. A22C 17/04 241/275 |
| 3,913,174 A * | 10/1975 | Paoli .................. A22C 21/0092 452/128 |

(Continued)

FOREIGN PATENT DOCUMENTS

| WO | 2010070433 A2 | 6/2010 |
| WO | 2010103376 A2 | 9/2010 |

OTHER PUBLICATIONS

International Search Report dated Sep. 4, 2013, corresponding to International Patent Application No. PCT/IB2013/050067.

*Primary Examiner* — Ibrahime A Abraham
*Assistant Examiner* — Gyounghyun Bae
(74) *Attorney, Agent, or Firm* — Ladas & Parry LLP; Malcolm J. MacDonald

(57) ABSTRACT

A machine for extracting puree, or fruit juice, from a product of animal or vegetable origin, provides a hollow body having a longitudinal axis. In the hollow body a sieve is mounted having a plurality of holes, in order to result co-axial to the hollow body same. The machine also includes a rotor mounted coaxially in the sieve and having a plurality of blades arranged to cause a centrifugal force to the product to treat, in order to separate it into a main product that crosses the sieve and that is discharged through a first outlet and into a waste material that, instead, cannot cross the sieve and is discharged through a second outlet.

14 Claims, 16 Drawing Sheets

(56) References Cited

U.S. PATENT DOCUMENTS

| | | | | |
|---|---|---|---|---|
| 4,062,148 A * | 12/1977 | Edmonds, Jr. | A01G 23/04 | 47/76 |
| 4,255,459 A * | 3/1981 | Glen | A23B 4/0053 | 426/510 |
| 4,372,766 A * | 2/1983 | Andrepont | B01D 9/04 | 62/532 |
| 4,518,621 A * | 5/1985 | Alexander | B30B 9/02 | 100/117 |
| 4,643,085 A | 2/1987 | Bertocchi | | |
| 4,763,580 A * | 8/1988 | Garland | A47D 1/004 | 108/91 |
| 4,774,097 A * | 9/1988 | Bushman | A23N 1/00 | 100/117 |
| 4,852,814 A | 8/1989 | Amiot et al. | | |
| 4,907,963 A * | 3/1990 | Neff | F23C 5/06 | 239/281 |
| 4,953,794 A * | 9/1990 | Paoli | A22C 17/04 | 241/24.16 |
| 5,587,073 A * | 12/1996 | Zittel | B01D 33/11 | 210/372 |
| 5,894,791 A * | 4/1999 | Rose | B30B 9/241 | 100/121 |
| 5,906,154 A | 5/1999 | Yoon et al. | | |
| 6,079,647 A * | 6/2000 | Leduc | D01B 1/16 | 19/24 |
| 6,234,066 B1 * | 5/2001 | Zittel | A23B 7/06 | 99/348 |
| 6,347,579 B1 * | 2/2002 | Houri | B02B 3/045 | 99/488 |
| 6,615,543 B1 * | 9/2003 | Palsrok | A01G 9/022 | 47/86 |
| 7,622,140 B2 * | 11/2009 | Whittle | B01D 11/0242 | 424/725 |
| D638,174 S * | 5/2011 | Wolk | D30/121 | |
| RE42,732 E * | 9/2011 | Zittel | A23B 7/06 | 99/348 |
| 2002/0179181 A1* | 12/2002 | Murphy | E02F 3/437 | 144/34.1 |
| 2004/0149147 A1* | 8/2004 | Bayus | A23G 3/0085 | 99/516 |
| 2005/0184103 A1* | 8/2005 | Palma | B65G 33/32 | 222/413 |
| 2006/0120566 A1* | 6/2006 | Myogadani | G01N 21/82 | 382/109 |
| 2007/0274075 A1* | 11/2007 | Nagamune | G02B 5/0221 | 362/259 |
| 2008/0006003 A1* | 1/2008 | Skendzic | E02D 27/02 | 52/741.1 |
| 2008/0134485 A1* | 6/2008 | Mayfield | B23Q 1/623 | 29/56.6 |
| 2008/0308469 A1* | 12/2008 | Kato | B07B 1/20 | 209/287 |
| 2009/0200824 A1* | 8/2009 | Garceau | B60P 3/34 | 296/26.13 |
| 2011/0186500 A1* | 8/2011 | Czwaluk | B30B 9/18 | 210/225 |
| 2011/0244100 A1 | 10/2011 | Bertocchi | | |
| 2012/0037013 A1 | 2/2012 | Bertocchi | | |
| 2012/0118023 A1* | 5/2012 | Guerrero Lara | D06F 13/06 | 68/12.19 |

* cited by examiner

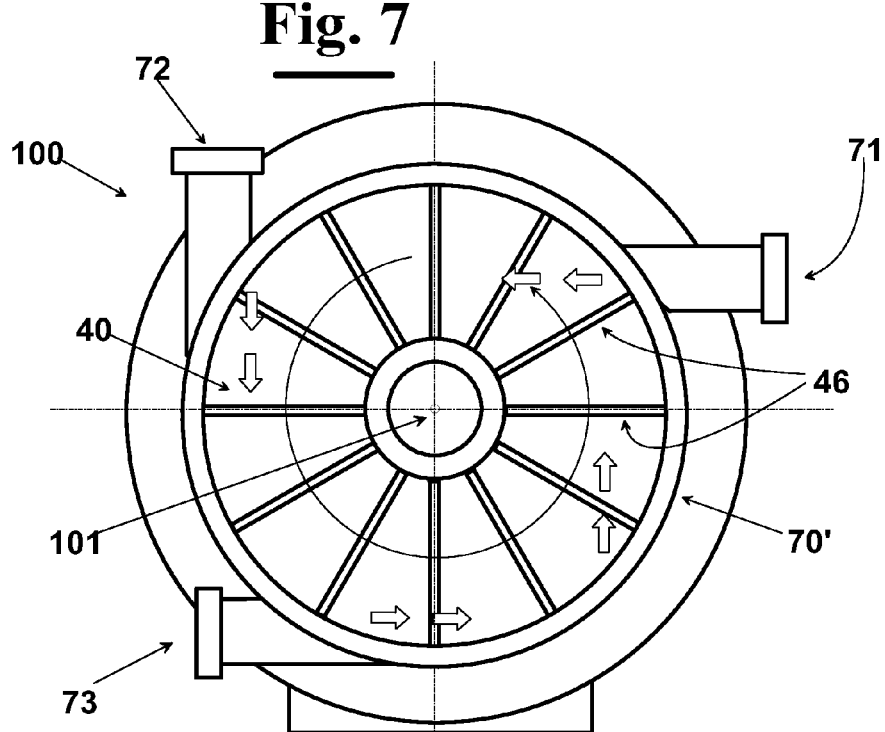
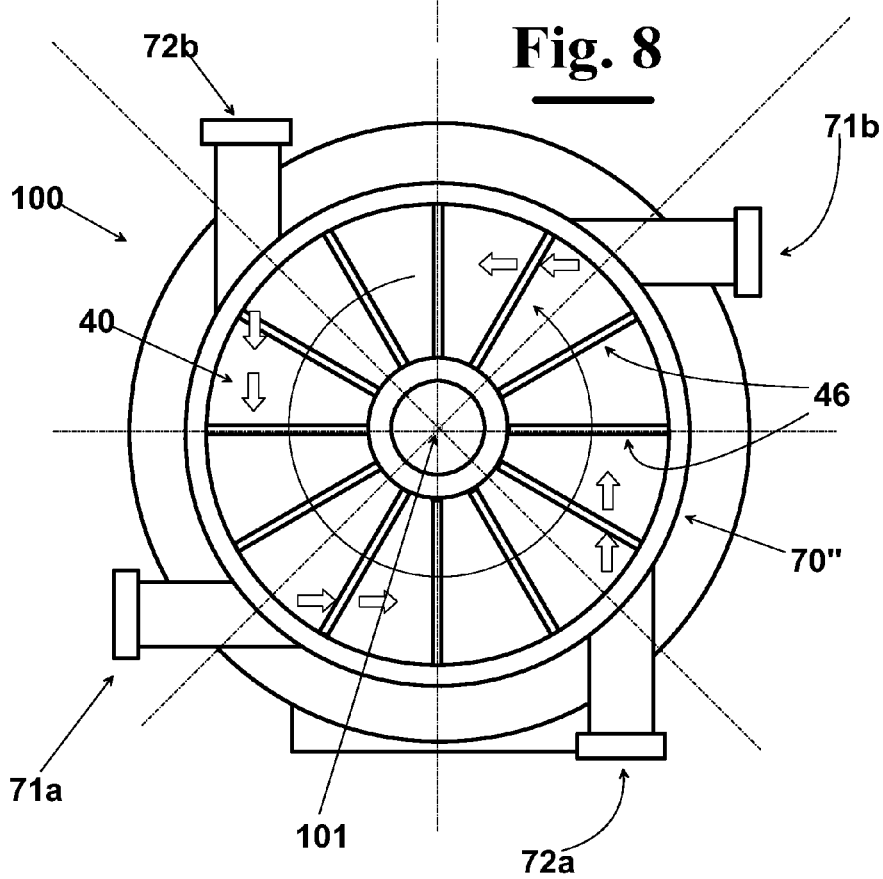

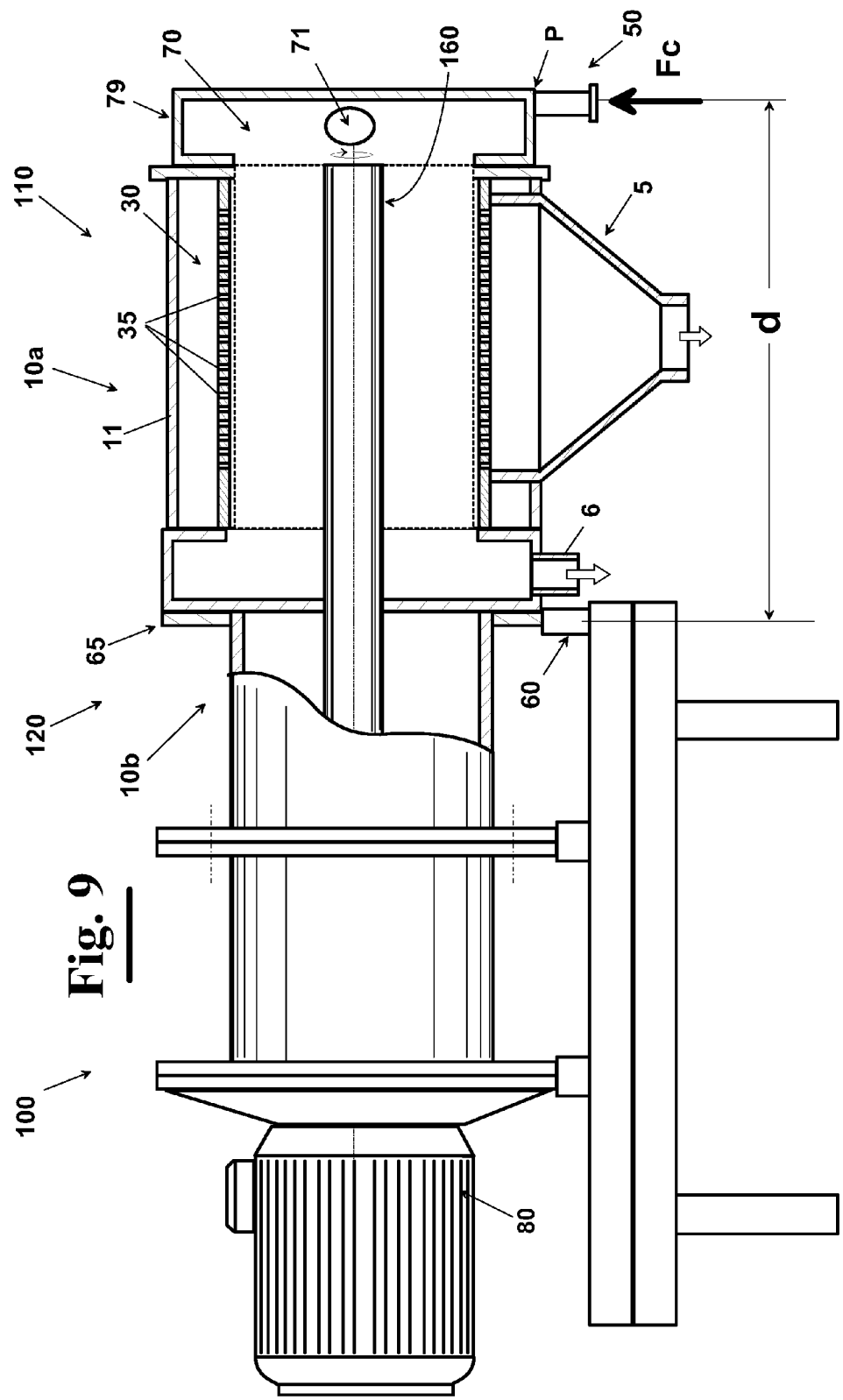

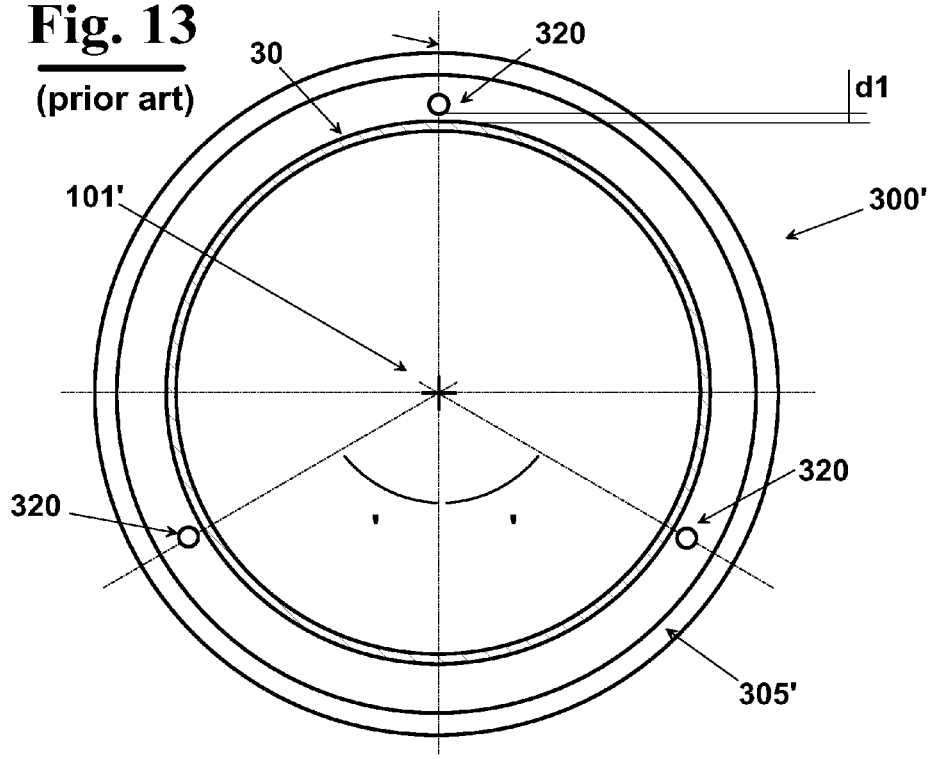
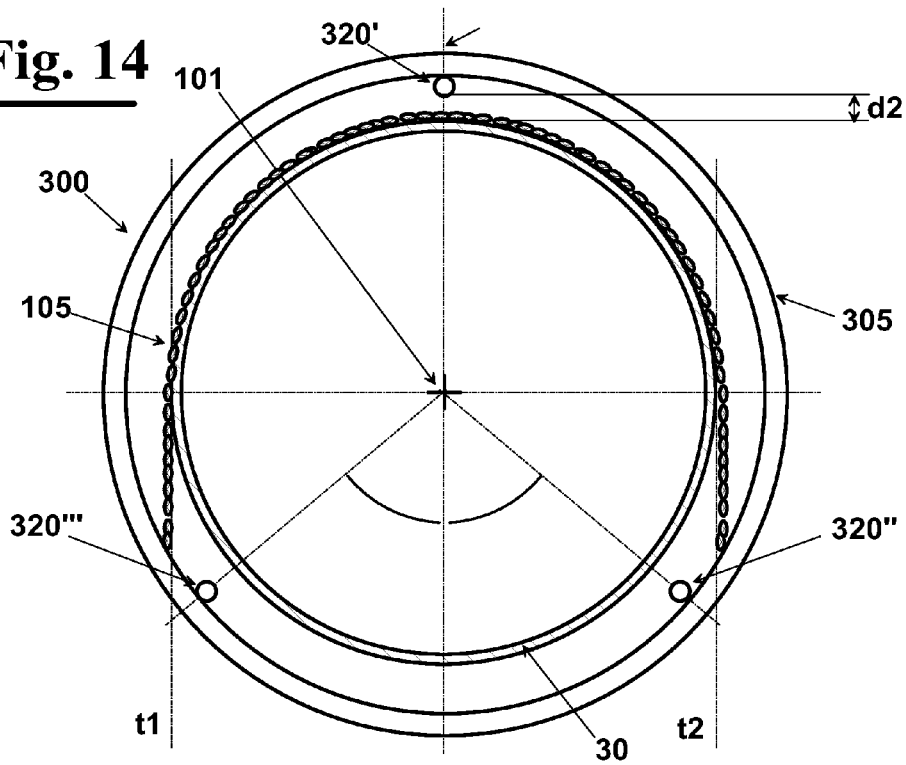

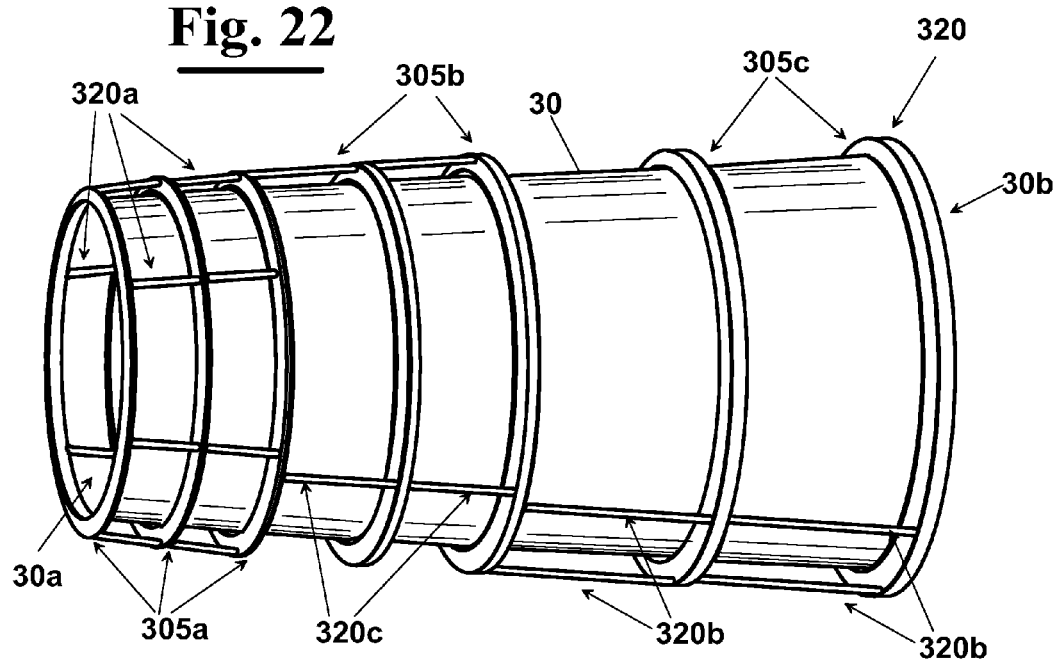
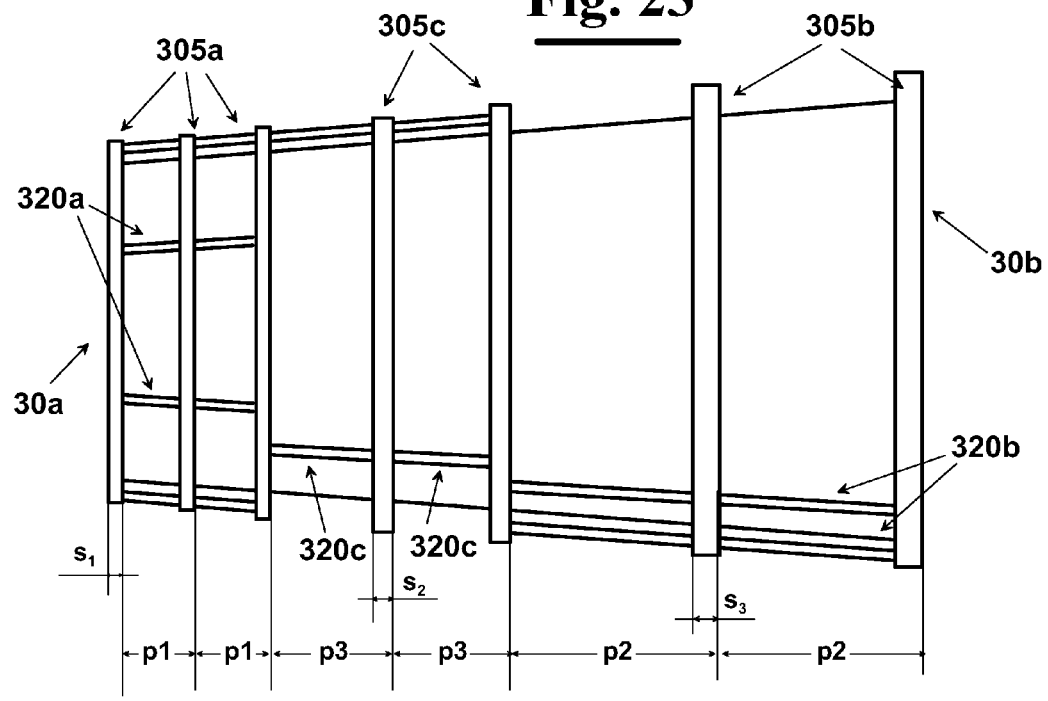

METHOD AND A MACHINE FOR PRODUCING PUREE, OR JUICE, FROM FOOD PRODUCTS WITH HIGH PRODUCTION CAPACITY

This application is a 371 of PCT/IB2013/050067, filed on Jan. 3, 2013, which claims priority to Italian Application No. PI2012A000001, filed Jan. 4, 2012.

FIELD OF THE INVENTION

The present invention relates to a method for the food industry, and, in particular it relates to a machine for extracting puree, or fruit juice from food products of vegetable origin, or animal.

The invention relates, furthermore, to a machine for extracting juice and puree from vegetable or animal food that carries out this method.

DESCRIPTION OF THE PRIOR ART

As well known, the industrial extraction of juice and puree mainly from food products, in particular from plant products, such as fruit and vegetables, but also from animal products, such as meat and fish, is effected by means of rotating machines, such as rough extraction machines and finishing extraction machines.

The rotating machines of the prior art comprise, in particular, a driven impeller, or rotor, which is caused to rotate quickly about a rotation axis by a motor. More precisely, the rotor is peripherally equipped with a plurality of blades and is mounted within a perforated wall, or sieve, having cylindrical or conical shape.

During its rotation about its rotation axis, the rotor brings a centrifugal force to the treated product that causes it to pass selectively through the sieve.

This way, the treated product is filtered through the holes of the sieve and the useful part, i.e. the main product containing the pulp and the puree, is conveyed and withdrawn through a first outlet for being then subject to further treatments, whereas a part to dispose of, which in case of fruit contains mainly the skin and the seeds, is carried axially opposite to the inlet and is automatically conveyed towards a discharge exit.

Normally, the efficiency of the extraction machine is the ratio between the useful amount extracted by the machine and the input amount. Under same other conditions the extraction efficiency increases normally with increasing the angular speed, since the higher is the angular speed, the higher is the contribution of the centrifugal force to bringing the puree through the holes of the sieve and then the higher is the efficiency of the process.

In the prior art machines the product to treat is fed by a single feeding duct. This is usually connected to a cylindrical distributor through which the product to treat is started towards the rotor. The distributor is usually mounted in a position co-axial to the hollow body in which the rotor and the sieve are housed.

In case of high amount of product to treat, i.e. of high flows of product as input, the prior art machines tends to unbalance and to vibrate due to an unbalanced load of the blades on the radial surface of the rotor. Furthermore, owing to a high stiffness of the machine different loads can be achieved, owing to different apparatus that can be used upstream of the machine for feeding the product.

Another drawback observed in the prior art machines is that for treating a high amount of product it is necessary to provide a large, and therefore heavy, rotor and sieve unit. This causes complex operations of extraction and of introduction of the sieve from/into the machine which are periodically carried out for extraordinary and planned maintenance of the machine.

More in detail, as well known, the sieve is mounted to a support frame, or "sieve cage". The support of the sieve comprises a plurality of ring portions coaxial to each other and connected by a predetermined number of connection portions. Each connecting portion is arranged at a predetermined distance from the side of the ring portions. Therefore, between each connecting portion and the plurality of ring portions "stairs" are formed that prevent an extraction of the sieve from the machine by sliding. More in detail, on the inner wall of the hollow body grooves are provided that owing to the presence of the stairs show obstacles against a free sliding of the sieve cage. Therefore, it is possible to extract the sieve cage only partially by sliding. So, it is necessary lifting the sieve cage manually, or by mechanical lifting devices, for passing the obstacles and to complete the extraction from the machine.

Another drawback of the large prior art machines is the difficulty of monitoring by a visual control the correct operation. More in detail, in order to carry out the visual control of the different parts of the machine in operating conditions, the wall of the hollow body has a inspection porthole. However, for large machines such a solution is scarcely effective since through the porthole it is possible to see only one very limited part of the inside of the machine.

Another drawback of the large machines of the prior art is that owing to the large size of the sieve and of the rotor, and then to the respective high weights, high loads and actions are generated that can cause the misalignment of the rotor and of the sieve, i.e. a lack of coaxiality of the same. A similar problem occurs also when the sieve is put in the machine at the start-up, or at the end of a maintenance operation.

The misalignment of the sieve with respect to the rotor can bring to concentrating the loads and the actions in determined parts of the machine and to cause the blades of the rotor to slide on the surface of the sieve. This would cause an acceleration of the wear of the blades of the rotor and of the surface of the sieve and can affect the quality of the final product.

For all the drawbacks as above exposed, the prior art machines do not allow exceeding a predetermined production capacity, usually about 120-130 t/hr, to avoid the risk of overloading the different mechanical parts and of affecting the correct operation of the same.

A machine and a method for making puree, or juice, of the prior art with the above described limits is described, for example, in U.S. Pat. No. 4,643,085.

SUMMARY OF THE INVENTION

It is therefore a feature of the invention to provide a machine for extracting puree, or fruit juice, which achieves a high production capacity without causing the above described drawbacks of the machines of the prior art.

These and other features are accomplished with one exemplary machine for extracting puree, or fruit juice, from a food product, in particular of vegetable origin, said machine comprising:
- a hollow body having a longitudinal axis;
- a sieve having a plurality of holes and mounted in said hollow body in a position substantially co-axial to said hollow body same and, a rotor mounted in said sieve in a position substantially co-axial to it, said rotor arranged to rotate in the sieve and having a plurality of blades arranged to cause a centrifugal force to the product to treat, in order to separate said product to treat into a main product comprising said puree, or juice, which crosses said sieve and is discharged through a first outlet, and a waste material that, instead, cannot cross said sieve and is discharged through a second outlet;

a distributor integral to said hollow body and arranged to receive said product for distributing it to said rotor;

whose main feature is that at least a first and a second feeding duct of the product to treat in said distributor are provided, said at least one first and second feeding duct arranged to feed said product along a respective feeding direction substantially tangential to said distributor, in order to balance the feeding in a radial direction of said product to treat towards said rotor and to obtain a substantially equally distributed load on said blades.

Advantageously, the first and the second feeding ducts are configured to feed said product to treat in a direction concordant to the peripheral rotation of said rotor about said longitudinal axis.

It is also provided a case where the first and the second feeding ducts supply said product to treat in a direction which is opposite to the direction concordant to the peripheral rotation of said rotor about said longitudinal axis, i.e. in a direction opposite to the peripheral rotation of said rotor about said longitudinal axis.

Notwithstanding reference has been generally made to one sieve and to one rotor, it can be also provided that the machine comprises a plurality of rotors mounted coaxially and/or a plurality of sieves mounted coaxially. The technical solution that provides a plurality of sieves and/or a plurality of rotors is particularly advantageous in case of machines of large capacity. This way, in fact, both the maintenance operations of the sieve and of the rotor and the disassembly/assembly thereof are remarkably assisted.

The technical solution provided by the present invention makes it possible to process a high amount of product without affecting the stability of the machine and then the correct operation of the mechanical parts involved, as well as to obtain, therefore, a production rate very higher than obtainable with prior art machines of similar kind. The above described structure of machine for extracting puree, or fruit juice, from a food product, in particular of animal or vegetable origin, is particularly advantageous case of high capacity production for example higher than 130-140 t/hr of product to treat.

In particular, the sieve can be fixed, or movable, with respect to the rotor in operating conditions.

In particular, the first and the second a duct can be arranged in diametrically opposite positions with respect to said longitudinal axis. Similarly, if it is provided an even number of feeding ducts, the feeding ducts of each couple can be arranged in diametrically opposite positions with respect to said longitudinal axis.

Advantageously, both the first and the second feeding ducts are provided substantially horizontal. Therefore, both the first and the second feeding directions are substantially horizontal.

In a possible exemplary embodiment, the distributor has at least one first, a second and a third feeding duct. In this case, the first, the second and the third feeding duct can be arranged at an angular distance of about 120°.

In a possible exemplary embodiment of the invention, the first and the second feeding ducts are connected to a feeding main duct by a connection fitting. This way, said first and said second feeding ducts are connected to a same feeding means through said main duct.

Alternatively, the first and the second feeding duct can be independent. In this case, each feeding duct can be connected to respective product feeding means.

Therefore, it is possible to adapt the machine to different operating conditions and to different needs, adapting the size of the ducts to the spaces to arrange.

In particular, the distributor can engage in a removable way with the body of the machine. This way, it is possible to provide easily and quickly to the change of a first distributor with a second distributor different from the first. For example, the first and the second distributor can have a different number of feeding ducts and/or it can have feeding ducts oriented in a different way with respect to the distributor same and/or it can have feeding ducts of different diameter.

This way, it is possible to make a machine that is highly flexible adapting it to different needs by simply changing the first distributor with another distributor different from the first.

In particular, the distributor has an inner wall which is substantially cylindrical, or conical, co-axial to the hollow body and said first and said second feeding ducts are configured to feed said product along a respective direction substantially tangential to said inner wall of said distributor.

With a feeding direction of the product substantially tangential to the distributor it is meant that the flow speed of the entering product has a tangential component that is larger than the radial component. In particular, each duct among the first and the second feeding duct is configured to feed said product in said distributor along a respective feeding direction that form a predetermined angle α with a line tangential to said cylindrical wall of said distributor, with α set between about −60° and about +60°.

Advantageously, an adjustment means is provided for adjusting the relative position of the sieve and of the rotor, said adjustment means arranged to provide the coaxiality between sieve and rotor.

In particular, the problem of the coaxiality between sieve and rotor is particularly felt in the machines of large size for which the loads that bear on the different parts of the machine are higher.

Advantageously, the sieve is integral to a containing wall of the hollow body and a support means is provided arranged to support cantilever-like said hollow body.

In particular, the adjustment means for adjusting the relative position of the sieve and of the rotor comprises a force application means which is adapted to apply a predetermined correction force Fc on said containing wall at a position located at a predetermined distance d from said support means, said correction force Fc arranged to cause a predetermined controlled movement of said containing wall and, accordingly, of the sieve to it integral. This way, it is possible to displace the sieve up for arranging it in a position co-axial to said rotor.

In particular, the application means can be arranged to apply a correction force substantially vertical, such that the movement caused on the containing wall of the hollow body and, accordingly, of the sieve, is a substantially vertical movement.

In case of more feeding ducts, i.e. at least one first and a second feeding duct, the actions to which in operating conditions both the sieve and the rotor are subjected cause an unbalance to the body of the machine along unpredictable directions. In this case, the adjustment means for adjusting the relative position of the sieve and of the rotor can comprise at least one among:

- a first force application means which is adapted to apply a first correction force Fc1 on said containing wall of said hollow body at a predetermined application point, said first correction force Fc1 having a first predetermined direction and being, then arranged to cause a controlled movement of said sieve along said first predetermined direction; and
- a second force application means which is adapted to apply a second correction force Fc2 on said containing wall of said hollow body at a predetermined application point, said second correction force Fc2 having a second predetermined direction and being, then arranged to cause a controlled movement of said sieve along said second predetermined direction;
- or a combination thereof.

Preferably, the first and the second force application means are configured to apply said first and said second correction force Fc1 and Fc2 along directions substantially orthogonal to each other, i.e. the first and the second predetermined directions are substantially orthogonal to each other.

In particular, the first correction force Fc1 can be substantially orthogonal to the longitudinal axis of the hollow body. In this case, the first correction force Fc1 is arranged to cause a controlled substantially vertical movement to the sieve.

Advantageously, the first force application means is arranged to apply the first correction force Fc1 in correspondence, or near to, of the lowermost point of the cylindrical body.

In particular, the second adjustment means can be arranged to apply the second correction force Fc2 along a substantially horizontal direction. In this case, the second correction force Fc2 is arranged to cause a controlled movement substantially horizontal to the sieve.

In particular, the first and the second force application means is mounted to a support that makes it possible to provide a relative movement with respect to the hollow body of the machine. This way, it is possible to arrange in turn the means for applying the force along a predetermined direction of correction according to the type of misalignment between sieve and rotor, for example occurred in operating conditions. In other words the means for applying the correction force are provided orientable with respect to the longitudinal axis of the hollow body of the machine.

In an exemplary embodiment of the invention the means for applying the correction force Fc on the lateral containing wall of the hollow body may comprise:

- a nut screw element integral to the wall of the hollow body;
- at least one screw arranged to engage, in particular by a screw threaded coupling, with said nut screw element for applying said correction force Fc on said lateral containing wall of the hollow body.

In particular, the screw is adapted to apply said force substantially vertical at the point arranged in the substantially axial position, i.e. of a plane passing through the longitudinal axis of the hollow body and orthogonal to it and arranged in the lowermost position of the hollow body.

Advantageously, a motor means is provided operatively connected to said rotor by a drive shaft, said motor means arranged to rotate said rotor about a rotation axis.

In particular, the support means is arranged at a connection flange to connect a first portion of the hollow body, in which, for example, the sieve and the rotor are housed with a second portion of the hollow body arranged to house, for example, the only drive shaft.

Advantageously, the connection flange is provided with a weakening, by a reduction of thickness, in order to augment the elasticity and reduce the stress generated at the flange during the step of relative positioning between sieve and rotor.

In a possible exemplary embodiment, the application means is arranged to apply the above described correction force Fc at the external wall of said distributor, advantageously, at the farthest end from the connection flange.

Advantageously, a frame provides a support for the sieve, or "sieve cage", to which the sieve is integral, said support of the sieve comprising a plurality of ring portions coaxially connected by a predetermined number of connection portions.

According to what provided by an aspect of the invention, each connecting portion is arranged substantially "aligned" with an outer edge of said plurality of ring portions, to avoid the production of "stairs" between the outer edge of the ring portions and each connection portion. This way, it is possible to provide an easy and precise sliding movement of the sieve cage in the hollow body. In particular, this structure provides the full extraction of the sieve from the machine easily and simply. The extraction of the sieve from the machine is, in fact, a step necessary both for carrying out planned maintenance, for example, for cleaning the sieve, or to replace it with a clean sieve, and for carrying out extraordinary maintenance, for example for replacing a damaged sieve with a new one.

In particular, the support of the sieve, or "sieve cage", may comprise:

- a first plurality of ring portions arranged in a first sieve section at a first pitch p1;
- at least a second plurality of ring portions arranged at a second pitch p2, with p2>p1, at a second sieve section, said second sieve section being farthest from the first sieve section by an inlet through which the product to treat is put in the hollow body.

Advantageously, the following are provided:

- a first connecting portion arranged at an axial plane of the hollow body at a top portion of the sieve cage;
- a second connecting portion arranged at an angular distance set between about +125° and about +135°, for example at about +130°, from the first connection portion;
- a third connecting portion located opposite to the second angular portion with respect to the axial plane, i.e. arranged at an angular distance set between about −125° and about −135°, for example at about −130°, from the first connection portion.

In particular, the angular distance of the second and of the third connecting portion with respect to the first connecting portion depends on the thickness S of the ring portions of the sieve cage.

Advantageously, a carriage for handling the sieve cage and the sieve to it integral is provided, said carriage for handling having a plane support that in use is arranged substantially at a same height of the distributor the machine in order to allow arranging on it the sieve cage once slidingly extracted from the hollow body.

In particular, the hollow body has an inspection device for monitoring its inner parts and testing the correct operation of the different mechanical parts.

Preferably, the inspection device comprises a plurality of couples of inspection windows arranged through the length of the lateral containing wall of the hollow body, each couple of inspection windows comprising a first and a second inspection windows overlapped to each other. More in detail, at the first inspection window of each couple, in use, a light source is arranged whereas through the second inspection window the inside of the hollow body lighted from the above described light source can be inspected, for example by an operator.

In particular, each couple of inspection windows is arranged at a predetermined distance from a couple of next inspection windows, in order to cover all the length of the hollow body in which the sieve is housed. This way, it is possible to inspect all the length of the sieve.

Alternatively, a single couple of inspection windows with elongated shape of predetermined length is provided, in particular of length larger than half the length of the containing wall of the hollow body that houses the sieve. Advantageously, its length is substantially equivalent to the length of all the containing wall of the hollow body that houses the sieve.

According to another aspect of the invention, a machine for extracting puree, or fruit juice, from a food product, in particular of animal or vegetable origin, said machine comprising:
- a hollow body having a longitudinal axis and defined laterally by a lateral containing wall;
- a sieve (30) having a plurality of holes (35) and mounted in said hollow body (10) in a position substantially co-axial to said longitudinal axis
- a rotor mounted in said sieve in a position substantially co-axial to said longitudinal axis, said rotor arranged to rotate in said sieve and having a plurality of blades arranged to cause a centrifugal force to the product to treat, in order to separate said product to treat into a main product comprising said puree, or juice, which crosses said sieve and is discharged through a first outlet, and a waste material that, instead, cannot cross said sieve and is discharged through a second outlet;
- a distributor integral to said body and arranged to receive said product for distributing it to said rotor;
- a cantilever support means for said hollow body;
- an adjustment means for adjusting the relative position of the sieve and of the rotor, said adjustment means comprising a force application means which is adapted to apply a predetermined correction force Fc having a predetermined direction on said side containing wall at a position located at a predetermined distance d from said support means, said correction force Fc arranged to cause a predetermined controlled movement, in a corresponding direction, of said containing wall and, accordingly, of the sieve to it integral.

In particular, the adjustment means for adjusting the relative position causes a lifting of the sieve up to a position co-axial to rotor.

In particular, the application means is arranged to apply a correction force substantially vertical, such that the movement caused on the containing wall of the hollow body and, accordingly, of the sieve is a substantially vertical movement.

Advantageously, in an exemplary embodiment of the present invention the adjustment means for adjusting the relative position of the sieve and of the rotor comprises:
- a first force application means which is adapted to apply a first correction force Fc1 on said containing wall of said hollow body, said first correction force Fc1 being substantially orthogonal to said longitudinal axis of the hollow body and being, then arranged to cause a controlled substantially vertical movement of said sieve;
- a second force application means which is adapted to apply a second correction force Fc2 on said containing wall of said hollow body, said second correction force Fc2 being substantially horizontal, and being, then arranged to cause a controlled movement substantially horizontal of said sieve, said second force application means arranged to apply said force substantially horizontal at a second application point.

In particular, the adjustment means for adjusting the relative position of the sieve and of the rotor may comprise:
- an nut screw element integral to the wall of the hollow body;
- a first screw arranged to engage with the nut screw element for applying a first correction force Fc1 on said lateral containing wall of the hollow body at the point P1 at a lowermost position of the hollow body, said first correction force Fc1 having a first application direction;
- a second screw arranged to engage with the nut screw element integral for applying a second correction force Fc2 at a second point of the containing wall of said hollow body, said second correction force Fc2 having an application direction substantially orthogonal to the application direction of said first correction force Fc1.

According to a further aspect of the invention, a machine for extracting puree, or fruit juice, from a food product, in particular of animal or vegetable origin, said machine comprising:
- a hollow body having a longitudinal axis and defined laterally by a lateral containing wall;
- a sieve having a plurality of holes and mounted in said hollow body in a position substantially co-axial to said longitudinal axis;
- a rotor mounted in said sieve in a position substantially co-axial to said longitudinal axis, said rotor arranged to rotate in said sieve and having a plurality of blades arranged to cause a centrifugal force to the product to treat, in order to separate said product to treat into a main product comprising said puree, or juice, which crosses said sieve and is discharged through a first outlet, and a waste material that, instead, cannot cross said sieve and is discharged through a second outlet;
- a distributor integral to said body and arranged to receive said product for distributing it to said rotor;
- a cantilever support means for said hollow body;
- a support of the sieve, or "sieve cage", to which the sieve is integral, said support of the sieve comprising a plurality of ring portions coaxially connected by a predetermined number of connection portions;

wherein each connecting portion is arranged substantially level to an outer edge of the plurality of ring portions to avoid the production of "stairs" between the edge of the ring portions and each connection portion.

According to still another aspect of the invention, a machine for extracting puree, or fruit juice, from a food product, in particular of animal or vegetable origin, said machine comprising:
- a hollow body having a longitudinal axis and defined laterally by a lateral containing wall;
- a sieve having a plurality of holes and mounted in said hollow body in a position substantially co-axial to said longitudinal axis;
- a rotor mounted in said sieve in a position substantially co-axial to said longitudinal axis, said rotor arranged to rotate in said sieve and having a plurality of blades arranged to cause a centrifugal force to the product to treat, in order to separate said product to treat into a main product comprising said puree, or juice, which crosses said sieve and is discharged through a first outlet, and a waste material that, instead, cannot cross said sieve and is discharged through a second outlet;

a distributor integral to said body and arranged to receive said product for distributing it to said rotor;

a support of the sieve, or "sieve cage", to which the sieve is integral, said support of the sieve comprising a plurality of ring portions coaxially connected by a predetermined number of connection portions;

wherein the support of the sieve, or sieve cage, comprises:

a first plurality of ring portions arranged in a first sieve section at a first pitch p1;

a second plurality of ring portions arranged at a second pitch p2, with p2>p1, at a second sieve section, said second sieve section being farthest from the first sieve section from an inlet of the product to treat in said hollow body.

In particular, the support of the sieve, or sieve cage, comprises:

a first plurality of ring portions arranged at the first sieve section with a first pitch p1;

a second plurality of ring portions arranged at a second sieve section at a second pitch p2, with p2>p1, said second sieve section being farthest from the first sieve section from the inlet of the product to treat, and at least a third plurality of ring portions arranged at a third sieve section located between said first and said second sieve section, said ring portions of said third plurality arranged with a third pitch p3, with p1<p3<p2.

This structure of the sieve cage assists the sliding of the product extracted on the surface of the sieve at the portion of the sieve closest to the outlet of the extraction section, i.e. opposite to the entrance of the product to treat in the machine, where the product extracted is much thicker for gradual enrichment in the fibrous fraction of the product.

Advantageously, to avoid that, owing to the larger distance between the ring portions, in operating conditions, they can deform for high actions to which they are subject, the ring portions of the sieve section farthest from the inlet of the product have a thickness higher than the ring portions the portion of the sieve closest to the entrance of the product in the machine. This way, the ring portions of the sieve section arranged more upstream with respect to the entrance of the product are stiffened enough for resisting to the larger deformation owing to the above described actions.

In particular, in the sieve section farthest from the inlet of the product to treat the connecting portions can be arranged only in the lowermost part of the sieve cage. This way, the sliding of the product extracted along the surface of the sieve is assisted reducing remarkably the risk of having a jamming of the product between the sieve and the sieve cage.

According to a further aspect of the invention, a machine for extracting puree, or fruit juice, from a food product, in particular of animal or vegetable origin, said machine comprising:

a hollow body having a longitudinal axis and defined laterally by a lateral containing wall;

a sieve having a plurality of holes and mounted in said hollow body in a position substantially co-axial to said longitudinal axis;

a rotor mounted in said sieve in a position substantially co-axial to said longitudinal axis, said rotor arranged to rotate in said sieve and having a plurality of blades arranged to cause a centrifugal force to the product to treat, in order to separate said product to treat into a main product comprising said puree, or juice, which crosses said sieve and is discharged through a first outlet, and a waste material that, instead, cannot cross said sieve and is discharged through a second outlet;

a distributor integral to said body and arranged to receive said product for distributing it to said rotor;

a support of the sieve, or "sieve cage", to which the sieve is integral, said support of the sieve comprising a plurality of ring portions coaxially connected by a predetermined number of connection portions;

wherein the support of the sieve, or sieve cage, comprises:

a first plurality of ring portions arranged at a first sieve section, said first plurality of ring portions having a first thickness s1 and at least;

a second plurality of ring portions arranged at a second sieve section, said second plurality of ring portions having a second thickness s2, with s2>s1, said second sieve section being farthest from the first sieve section from an inlet of the product to treat in said hollow body.

In a possible exemplary embodiment, the support of the sieve, or sieve cage, comprises:

a first plurality of ring portions arranged at the first sieve section and have a first thickness s1;

a second plurality of ring portions arranged at a second sieve section and have a second thickness s2, with s2>s1, said second sieve section being farthest from the first sieve section from the inlet of the product to treat, and at least a third plurality of ring portions arranged at a third sieve section located between said first and said second sieve section, said ring portions of said third plurality having a third thickness s3, with s1<s3<s2.

BRIEF DESCRIPTION OF THE DRAWINGS

The invention will be now shown with the following description of an exemplary embodiment thereof, exemplifying but not limitative, with reference to the attached drawings in which:

FIGS. 7 and 8 show a front view of two possible exemplary embodiments of the machine of FIG. 1;

FIG. 9 shows a longitudinal sectional view of the machine of FIG. 1 for highlighting some technical features;

FIGS. 13 and 14 diagrammatically show cross sectional views of a sieve cage of the prior art and a sieve cage according to a possible exemplary embodiment of the present invention, respectively;

FIGS. 22 and 23 show an exemplary embodiment of the sieve cage of FIG. 11, according to a particular aspect of the present invention, in a perspective elevational side view and in a side view, respectively;

DESCRIPTION OF EXEMPLARY
EMBODIMENTS EXEMPLARY

Figure 1:
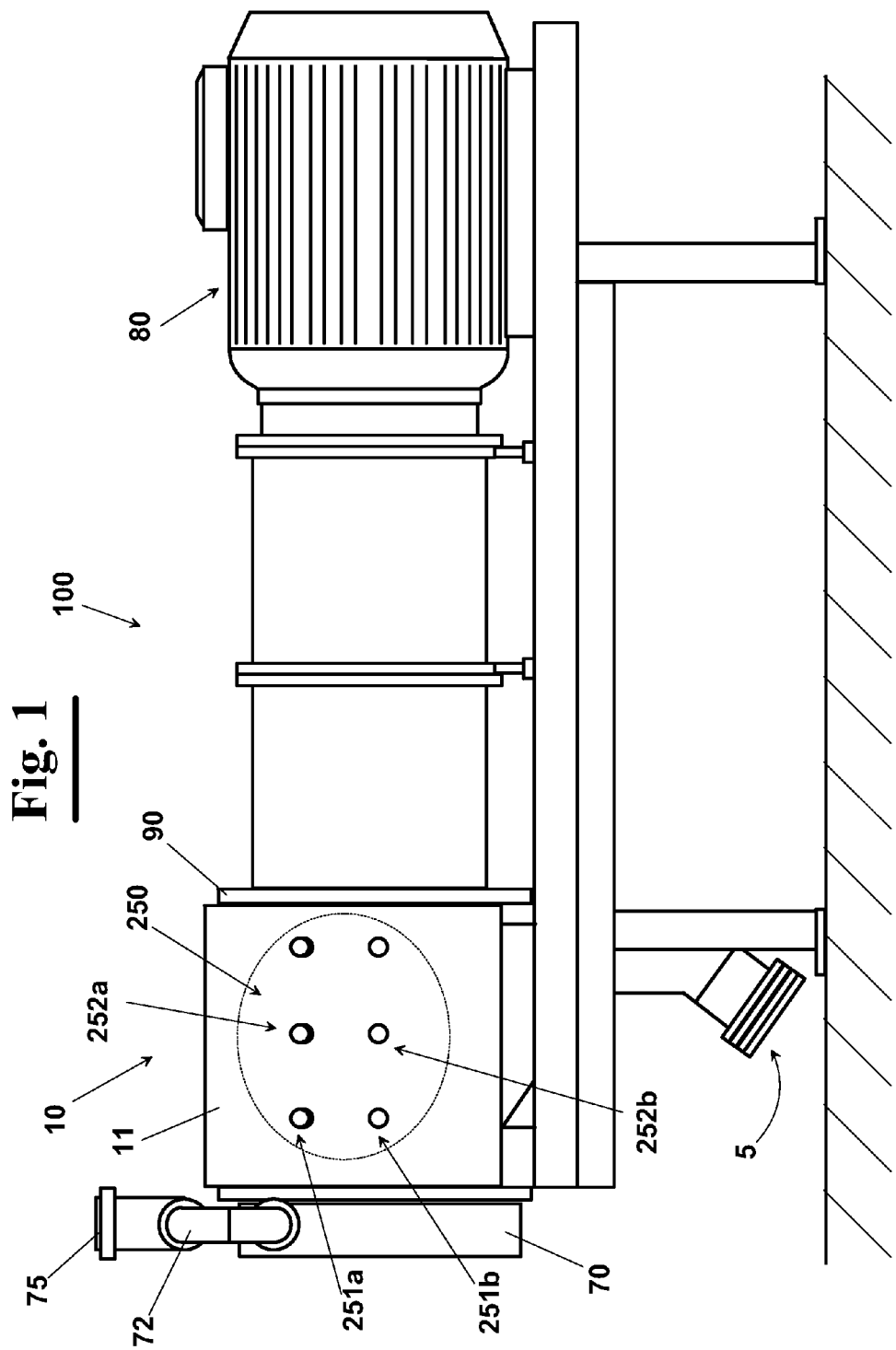
FIG. 1 diagrammatically shows an elevational side view of a machine, according to the invention, for extraction of juice, or puree from products of animal or vegetable origin.
Figure 2:
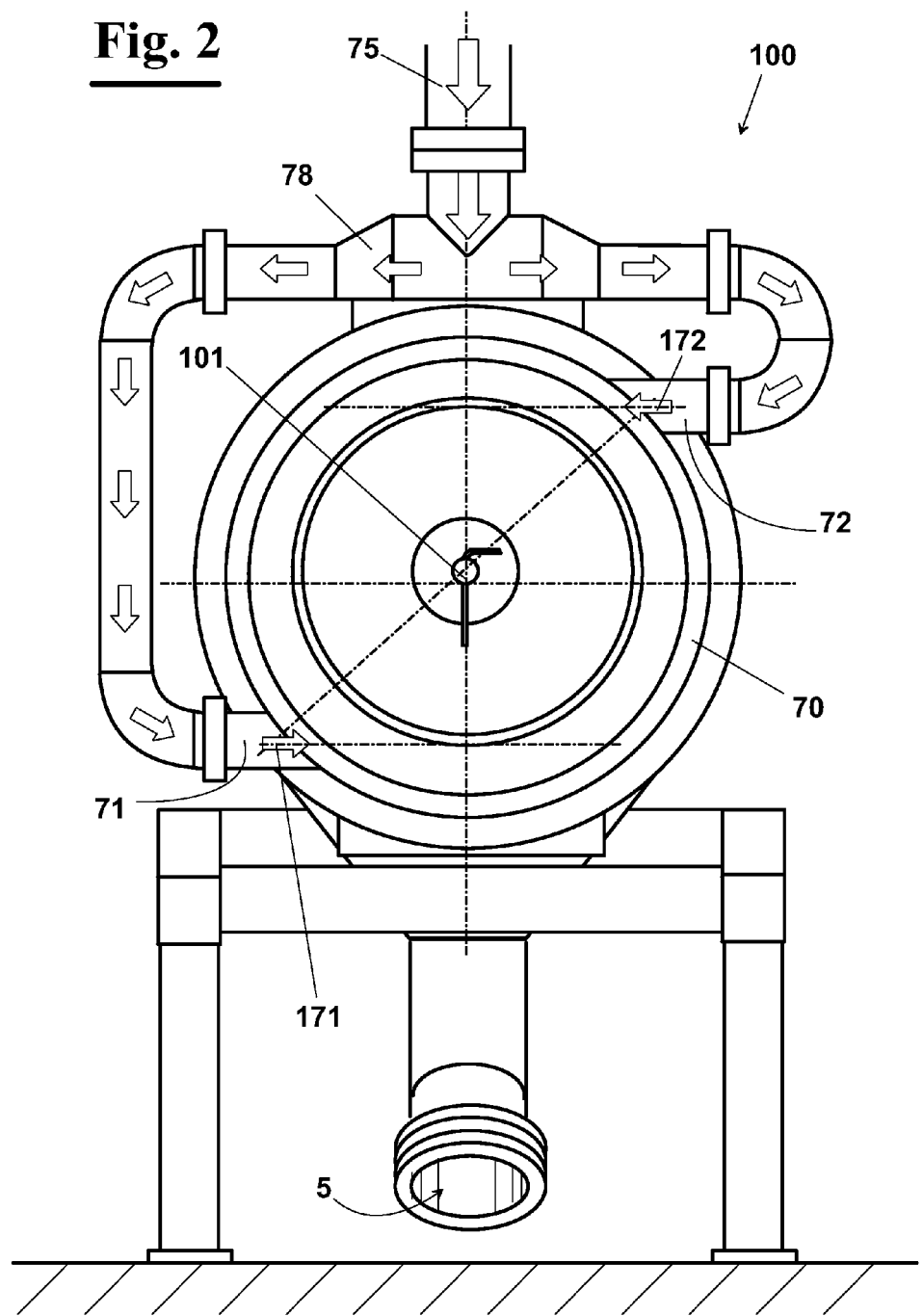
FIG. 2 shows an elevational front view of the machine for extraction of juice, or puree from products of animal or vegetable origin, of FIG. 1.
Figure 3:
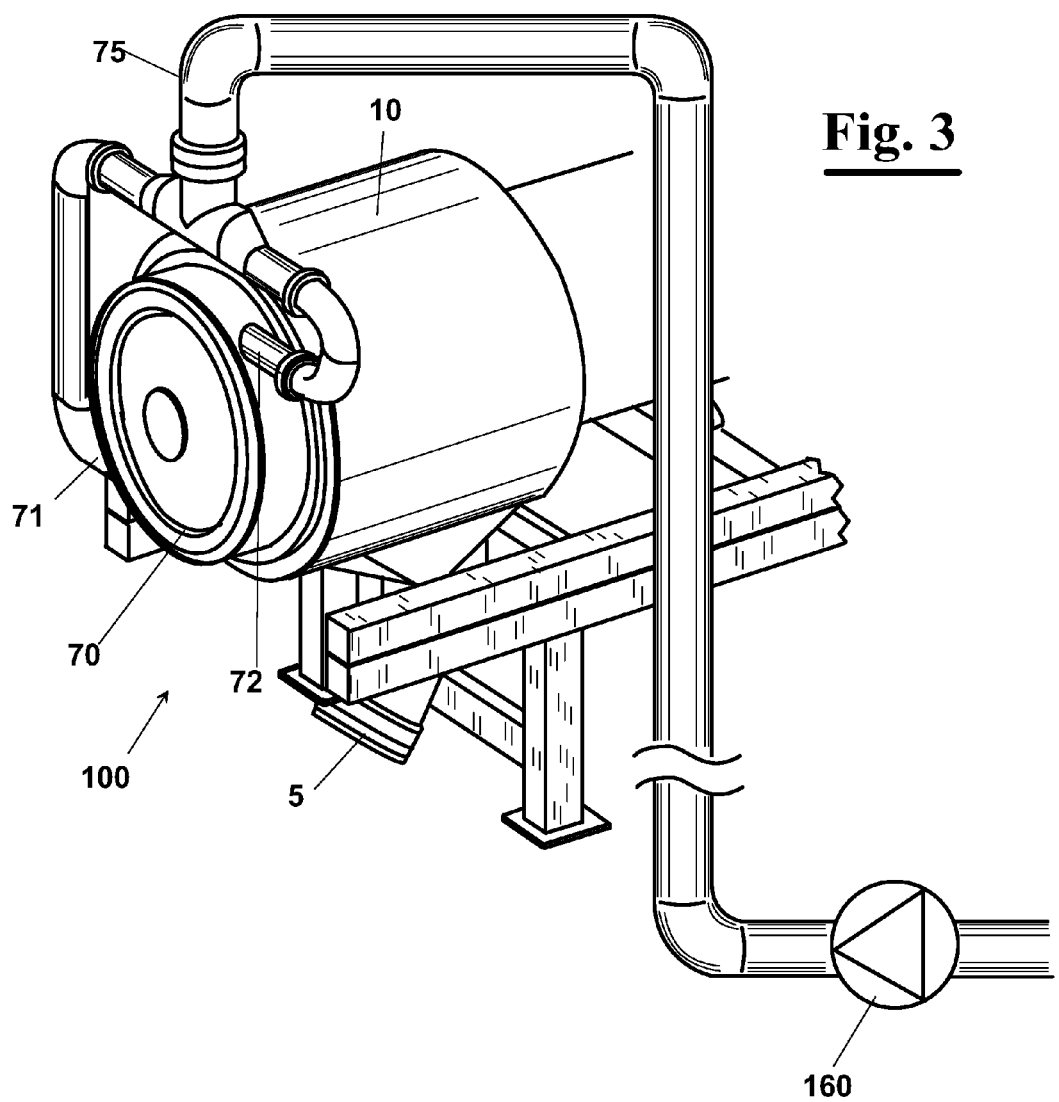
FIG. 3 shows a perspective view of the machine for extraction of juice, or puree from products of animal or vegetable origin, of FIG. 1.

In FIG. 1 for example a machine 100 is shown, according to the invention, for making puree, or fruit juice starting from vegetable or animal food, such as an extractor or a fine extractor. Machine 100 comprises a hollow body 10 in which a sieve 30 to it co-axial and having a plurality of holes 35 is housed. Machine 100 also comprises a rotor 40 mounted in sieve 30 coaxially, or in any case in a position substantially co-axial to it, and arranged to rotate about a rotor longitudinal axis 101. More in detail, rotor 40 has a plurality of blades 46 arranged to generate a centrifugal force in the product fed into machine 100, in order to separate the product to treat into a main product comprising the puree, or juice, which crosses sieve 30 and is discharged through a first outlet 5, and a waste material that, instead, cannot cross sieve and is discharged through a second outlet 6. In particular, the rotor 30 is wheeled about its axis 101 by motor means 80 operatively connected to rotor 30 by a drive shaft 85.

Furthermore, a distributor 70 is provided integral to hollow body 10 and arranged to receive the product to treat for distributing it to rotor 40, i.e. for feeding the food in sieve 30. Distributor 70 can have, for example, an inner wall which is substantially cylindrical 77, or conical, co-axial to hollow body 10.

According to a first aspect of the invention, a first feeding duct 71 and at least one second feeding duct 72 are provided in distributor 70 to feed the product to treat. More in detail, the first and the second feeding duct 71 and 72 supply the product to treat along a respective feeding direction 171 and 172 substantially tangential to distributor 70. In particular, each feeding direction 171 and 172 is substantially tangential to an inner wall 77 of distributor 70 and is, for example, concordant to the peripheral rotation 42 of rotor 40 about longitudinal axis 101. This way, a balanced feeding of the product to treat to rotor 40 is obtained and therefore a substantially equally distributed load on the blades 46 of rotor 40. In an exemplary embodiment not shown in detail in the Figures, but in any case according to the invention, feeding ducts 71 and 72 supply the product to treat in distributor 70 along a respective feeding direction not concordant to the peripheral speed of rotor 40 about longitudinal axis 101.

Figure 5:
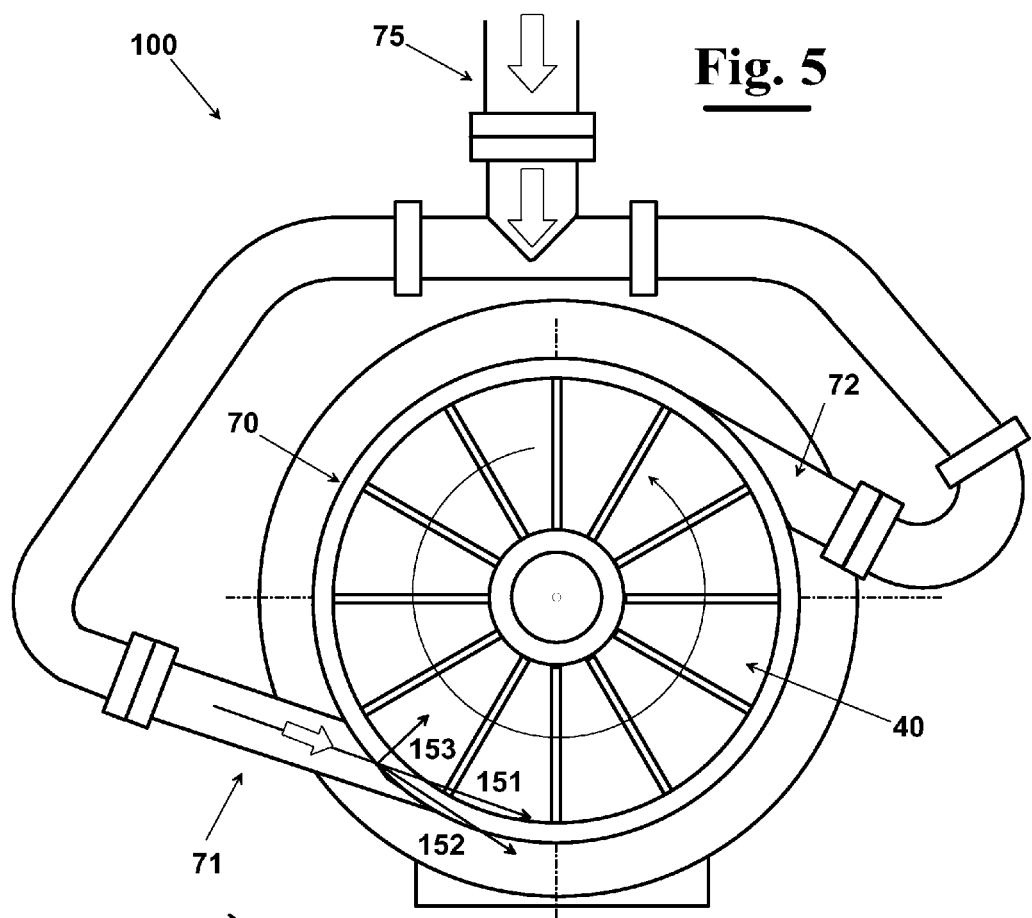
FIG. 5 shows an elevational front view, with the cover of the distributor open, of an exemplary embodiment of the invention of the machine of FIG. 1.
Figure 6:
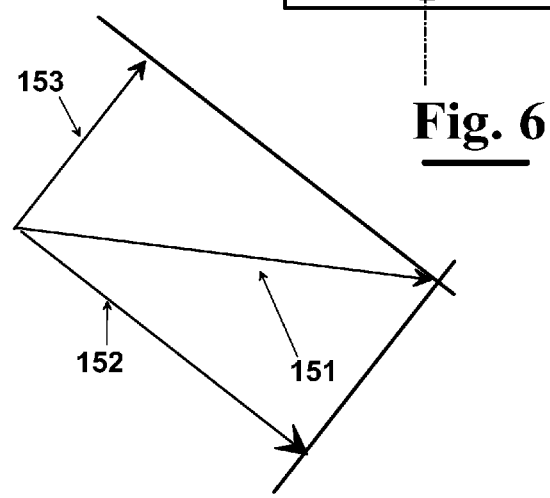
FIG. 6 diagrammatically shows the components tangential and radial of the flow speed as input in case of the machine of FIG. 5.

With a direction substantially tangential to distributor 70 a feeding direction is sought where the flow speed 150 of the fed product has a tangential component 152 larger than the radial component 153 (FIGS. 5 and 6). Normally, therefore, the feeding direction 151 of the flow 150 can form a predetermined angle α with the line tangential to the cylindrical wall of the distributor, with α set between about −60° and about +60°, in particular set between about −40° and about +40°.

The technical solution provided by the present invention makes it possible to process a high amount of product without affecting the stability of the machine and then the correct operation of the different mechanical parts involved and to obtain, therefore, a production rate very larger than that obtainable with prior art machines of similar kind without the risk of jamming, or of malfunctioning. The above described structure of the machine for extracting puree, or fruit juice, from a product of animal or vegetable origin, is particularly advantageous in case of high capacity, for example higher than 130-140 t/hr of product to treat.

As shown in Fig., the first and the second feeding ducts 71 and 72 can be arranged in diametrically opposite positions with respect to longitudinal axis 101. In an exemplary embodiment of FIG. 1, both the first and the second feeding ducts 71 and 72 are provided substantially horizontal. Therefore, both the first and the second feeding directions 171 and 172 are substantially horizontal. The first and the second feeding ducts 71 and 72 are connected to a feeding main duct 75 by a connection 78. This way, the first and the second feeding ducts 71 and 72 can be connected to a same feeding means 160 through main duct 75.

In an exemplary embodiment of the invention and not shown in the figures, the first and the second feeding ducts 71 and 72 can be connected to different feeding means for the product to treat and to be fed into machine 100.

In the exemplary embodiment of FIG. 7, distributor 70' comprises, instead, a first feeding duct 71, a second feeding duct 72 and a third feeding duct 73. In this case, the angular distance between the different ducts can be about 120°.

Figure 4:
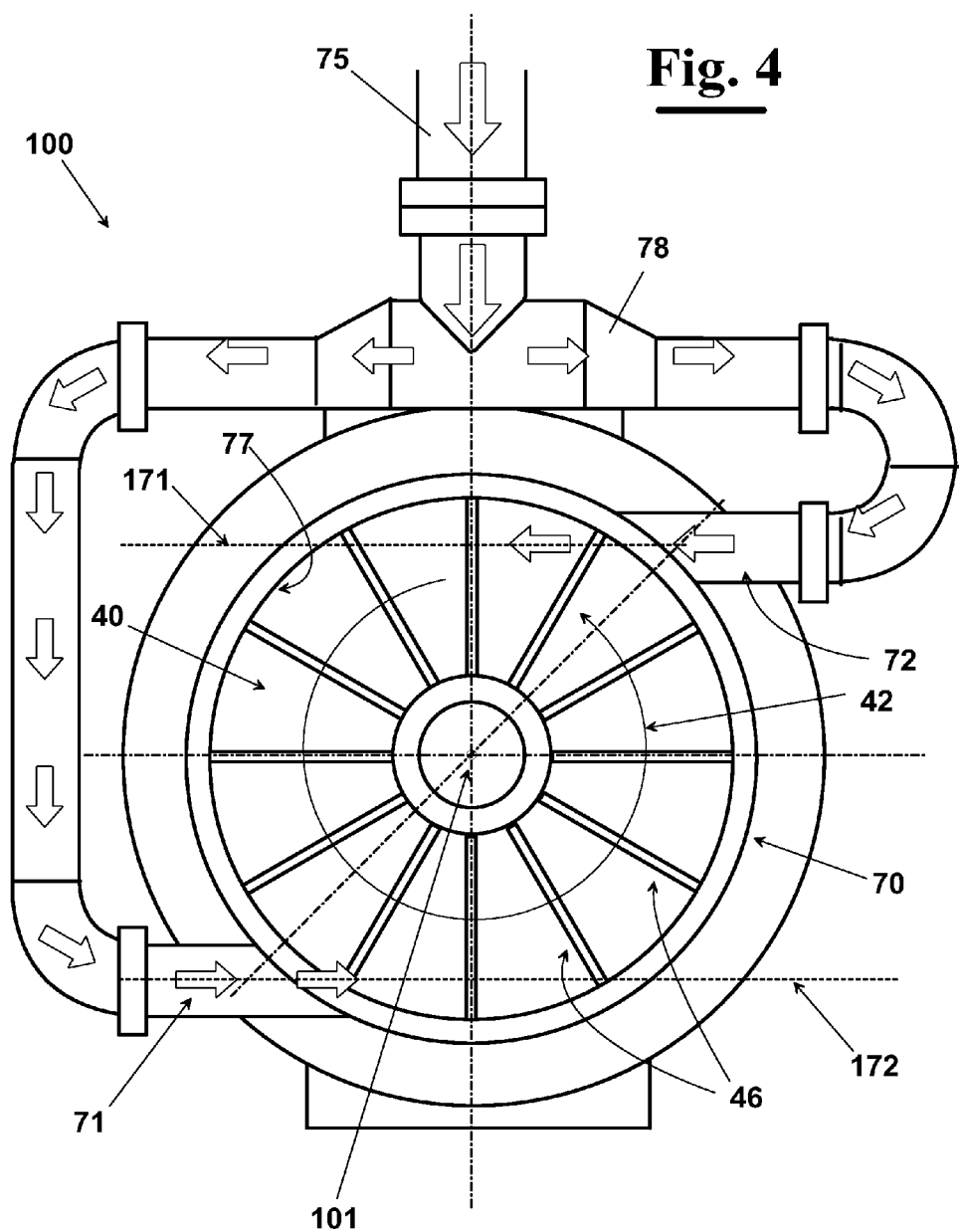
FIG. 4 shows the machine of FIG. 1 in an elevational front view with the cover of the distributor open.

In the exemplary embodiment of FIG. 8 distributor 70" can have an even number of feeding ducts larger than two, for example four feeding ducts 71a, 72a, 71b, 72b. As described with reference to FIG. 4, feeding ducts 71a and 71b, or 72a and 72b, of each couple are arranged in respective diametrically opposite positions with respect to longitudinal axis 101.

Distributor 70 can engage in a removable way with the body 10 of machine 100. This way, it is possible to replace distributor 70 with a different distributor 70'. For example, two distributors 70 and 70' can have a different number of feeding ducts 71, or 72, or 73, and/or can have feeding ducts 71, or 72, or 73 oriented in a different way with respect to distributor 70 same, and/or can have feeding ducts 71, or 72, or 73 having different diameter.

This way, it is possible to make machine 100 highly flexible adapting it to the different operative needs simply changing distributor 70.

As diagrammatically shown in FIG. 9, sieve 30 is provided integral to a side containing wall 11 of hollow body 10 and a support means is provided 60 arranged to support cantilever-like hollow body 10 and then sieve 30. According to another aspect of the invention, machine 100 can comprise a means 50 for adjusting the relative position of sieve 30 and of rotor 40. More in detail, the adjusting means 50 are adapted to provide a coaxiality between sieve 30 and rotor 40. As well known, in fact, sieve 30 and rotor 40, in particular for machines with high capacity, i.e. higher than about 130-140 t/hr, is particularly felt, since the larger is the size of the different components and the larger is the amount of treated product, the larger are the loads that bear on the different parts of the machine, and this can bring to a misalignment of rotor 40 and of sieve 30. Such technical problem is not particularly felt in the machines that provide a gap, in use, between sieve 30 and rotor 40, larger than about 2-3 mm, but it becomes of significant relevance in machines that provide a distance between sieve 30 and rotor 40 less than 1-2 mm. In the latter case, in fact, also a small shift from the condition of coaxiality can bring the blades 46 of rotor 40 to scrape on the surface of sieve 30 and then to wear with time the relative parts, in addition to a not correct working position of machine 100.

Figure 10A:
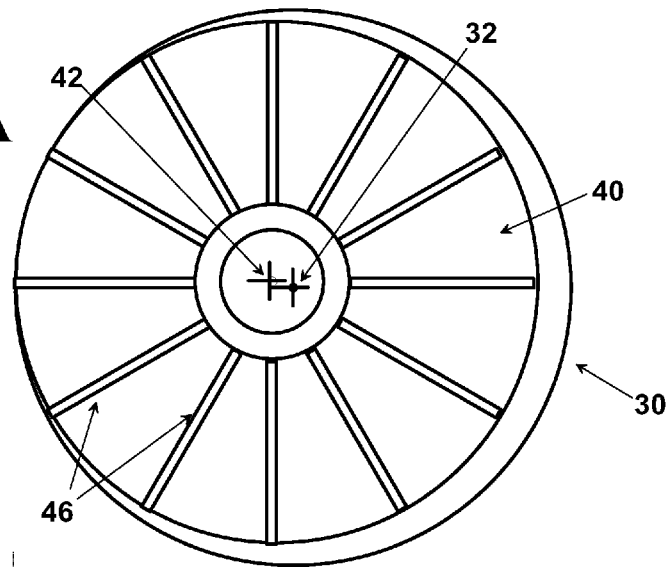
FIGS. 10A and 10B diagrammatically show two different relative positions between sieve and rotor for the machine of FIG. 1.
Figure 10B:
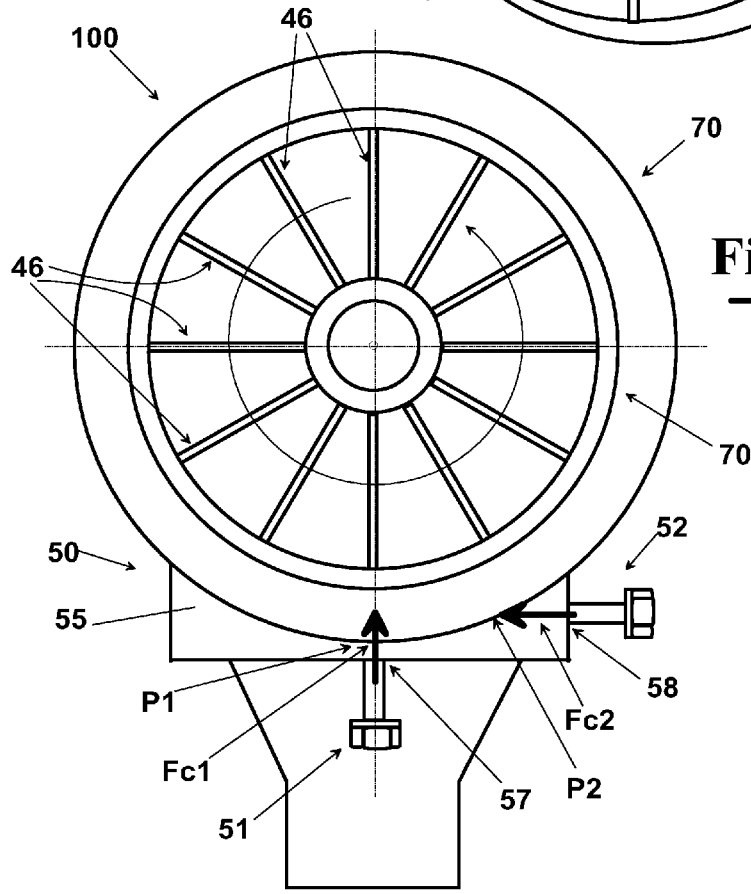
Figure 11:
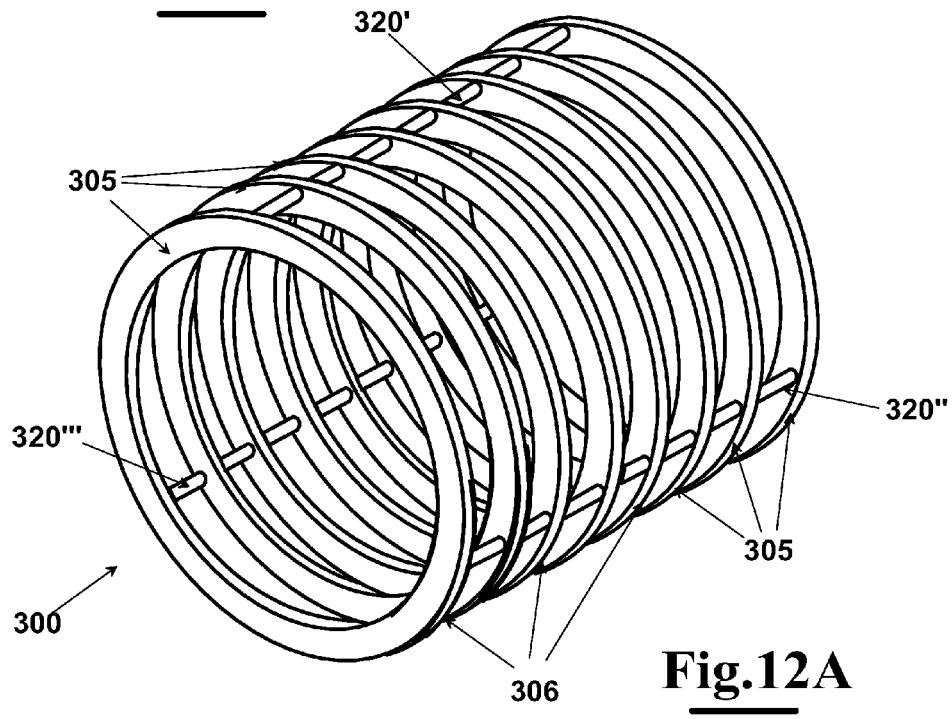
FIG. 11 shows a perspective view of a sieve cage provided by the present invention.

The means 50 for adjusting the relative position of sieve 30 and of rotor 40 comprise, preferably, a force application means 51, 52 for applying a predetermined correction force Fc on wall 11 of hollow body 10 at a respective position P1, P2 arranged at a predetermined distance d from the support means 60 (FIG. 10B). More in detail, the correction force Fc is selected to cause a predetermined controlled movement of the containing wall 11 and, accordingly, of sieve 30 to it integral. This way, it is possible to displace sieve 30 from a position, in which the centre of the sieve is not arranged on the same axis 101 of the centre 42 of rotor 40 (FIG. 10A) to a position, in which sieve 30 is co-axial to rotor 40 (FIG. 10B).

The correction force Fc can be a force exclusively vertical, such that the movement caused on the containing wall 11 of the hollow body and, accordingly, of sieve 30 is a substantially vertical movement. Alternatively, a first force application means 51 is provided adapted to apply a first correction force vertical Fc1 to wall 11 that contains hollow body 10 arranged to cause a controlled substantially vertical movement to the sieve, and a second adjustment means 52 is provided arranged to apply a second correction force substantially horizontal Fc2.

In the exemplary embodiment of FIG. 10A, the means 50 for applying the correction force Fc on wall 11 of hollow body 10 comprises a nut screw element 55 integral to wall 11 of hollow body 10 and a screw 51, 52 arranged to engage with said nut screw element 55 at a respective hole 57 and 58 for applying the above described correction force Fc on wall 11 of hollow body 10.

As diagrammatically shown in FIG. 9, the support means 60 can be arranged at a connection flange 65, which is located between a first portion of hollow body 10a where, for example, sieve 30 and rotor 40 are housed and a second portion of hollow body 10b, which is designed to house, for example, the only drive shaft 160. More in detail, connection flange 65 is weakened by a reduction of thickness, in order to augment the elasticity and reduce the stress on flange 65 same during the step of relative positioning between sieve 30 and rotor 40 operated by the adjustment means 50.

Always as shown in the example of FIG. 9, the adjustment means 50 is adapted to apply the above described correction force Fc at the wall 79 of distributor 70, advantageously, at the free end of the wall 79.

Figure 12A:
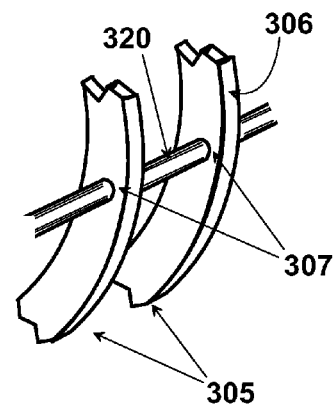
FIG. 12A shows a perspective view of detail a sieve cage of the prior art.

As well known, machine 100 comprises a support frame 300 of sieve 30, or "sieve cage" to which sieve 30 is integral. More in detail, the support frame 300 of sieve 30 comprises a plurality of ring portions 305 coaxial and connected by a predetermined number of connection portions, for example three connection rods 320', 320" and 320'". According to the invention each connecting portion 320', 320" and 320'" is arranged substantially level to the external edges 306 of ring portions 30. This way, the production is avoided of "stairs" 307 between edge 306 of ring portions 305 and each connecting portion 320', 320" and 320'", as, instead, it occurs in the solutions of the prior art, as diagrammatically shown in FIG. 12A. Such technical solution permits easily and simply a sliding of sieve cage 300 in hollow body 10 up to cause a full extraction from machine 100. Such step, necessary both for planned maintenance carried out for example for cleaning the sieve, or for its change with a clean sieve, or for extraordinary maintenance for replacing a damaged sieve with a new one, is made, in the prior art machines, carrying out a partial sliding of cage 300 in hollow body 10. When, in fact, the first stair 307 arrives near the open end of machine 100, the presence of grooves and sealings of the flange, blocks a further sliding of cage 300 and hinders, then, a complete extraction of sieve 30 by the machine. Therefore, in the prior art machines for completing the extraction of cage 300 from machine 100 it is necessary to lift cage 300 same, up to pass said obstacles and then complete the extraction of sieve 30. Such succession of operations, as easily understandable, is highly complex and expensive, versus both time and energy, for carrying cage 300 and sieve 30 out from machine 100.

The solution proposed by the present invention is, instead, capable of making remarkably easier the whole succession of operations that permits a full extraction of cage 300 and of sieve 30 from machine 100.

In the exemplary embodiment, as diagrammatically shown in FIG. 14, sieve cage 300 provides a first connecting portion 320' arranged at an axial plane γ at a top portion of sieve cage 300 same, a second connecting portion 320" arranged at a predetermined angular distance β from the first connecting portion 320' and a third connecting portion 320'", arranged in a position symmetric to the first connecting portion 320' with respect to axial plane γ.

In a machine of prior art, diagrammatically shown in FIG. 13, sieve cage 300 has three connecting portions 320 arranged at 120° (FIG. 13).

According to the invention, instead, the angular distance β can be advantageously higher than 120° and its value depending on the thickness S of ring portions 305 of sieve cage 300. This way, the position of the connecting portions 320" and 320'" is at the lines t1 and t2 tangent to sieve 30. Such position of the connecting portions 320" and 320'" allows the extracted 105 to slide along the surface of sieve 30 and then fall out of connecting portions 320" and 320'" that can be then easily passed avoiding that extracted product 105 stops between sieve 30 and sieve cage 300.

In particular, the angular distance β can be set between 125° and 135°, for example it is about 130°.

Figure 16:
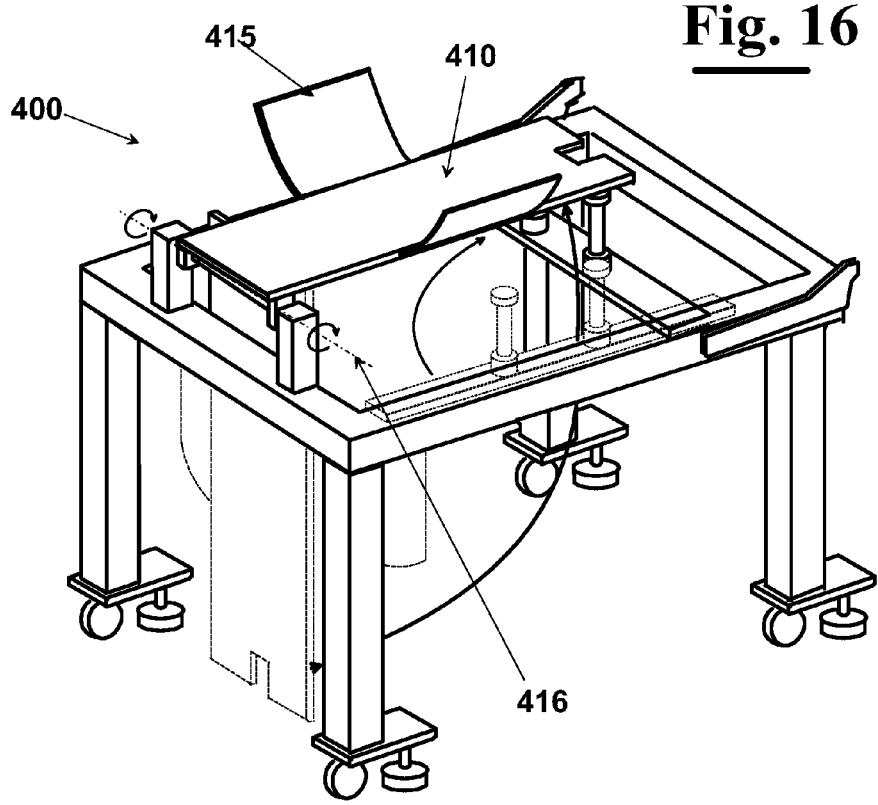
Figure 17:
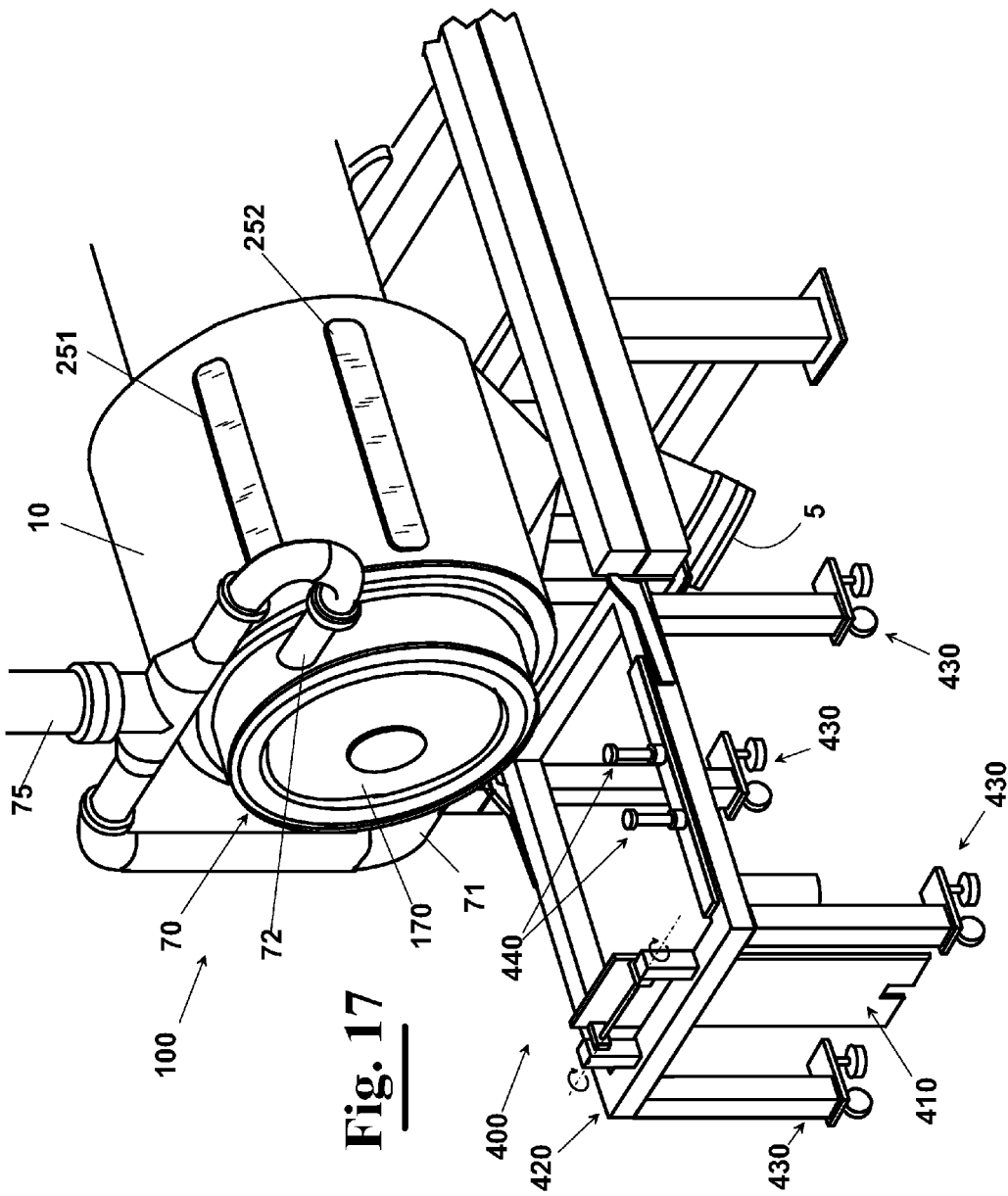
Figure 18:
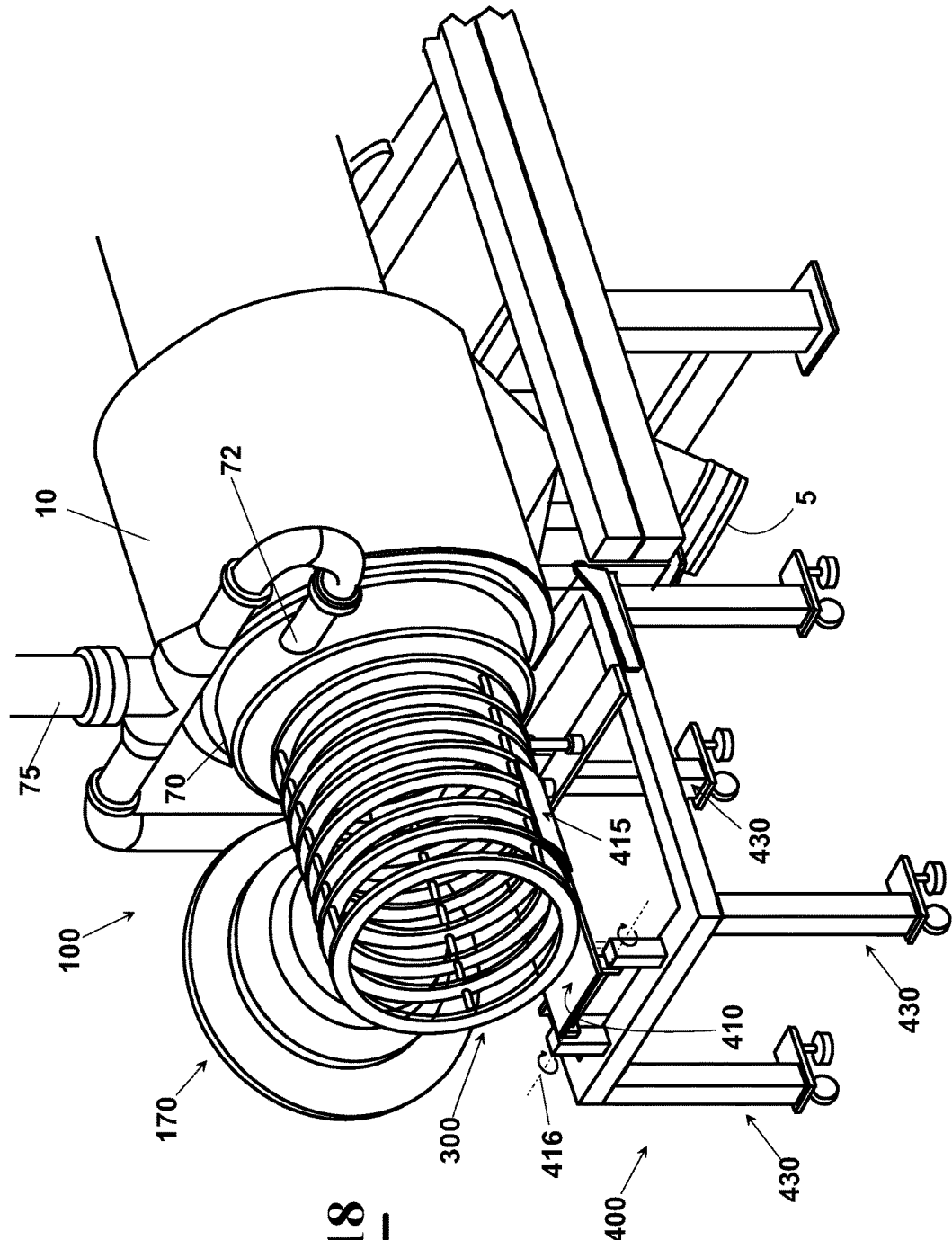

A carriage 400 is also provided for handling sieve cage 300 and sieve 30. Carriage 400 has a plane support 410 that, in use, is arranged substantially at a same height of distributor 70 of machine 100 in order to allow arranging sieve cage 300 on it once slidingly extracted from hollow body 10 (FIG. 18). More in detail, the plane support 410 is hinged to the carriage 400 and it is therefore capable of rotating about a rotation axis 416 for moving from a rest position, where it is arranged substantially vertical (FIGS. 15 and 17) and an operating position, where it is arranged substantially horizontal (FIGS. 16 and 18). The extraction of cage 300 and of sieve is carried out therefore through the steps of: approaching the carriage 400 to machine 100 with cover 170 of distributor 70 closed and the plane support 410 in rest position (FIG. 17), opening cover 170, arranging plane support 410 in an operation of position and sliding sieve cage 300 up to full extraction and arranging it on plane support 410 (FIG. 18).

According to still a further aspect of the invention, hollow body 10 has an inspection device 250 through which it is possible to monitor the inside of the machine and to test a correct operation of the different components. Preferably, inspection device 250 comprises at least one first couple of inspection windows 251a, 251b and at least one second couple of inspection windows 252a, 252b. More in detail, at first inspection window 251a, 252a of each couple a light source is arranged and at the second inspection windows 251b, 252b, an operator can look the inside of hollow body 10. Alternatively, or in addition, to aid an operator a video camera can be provided, or other monitoring devices, for monitoring the inside of the machine at second inspection windows 251b, 252b, step not shown in the figures.

Figure 15:
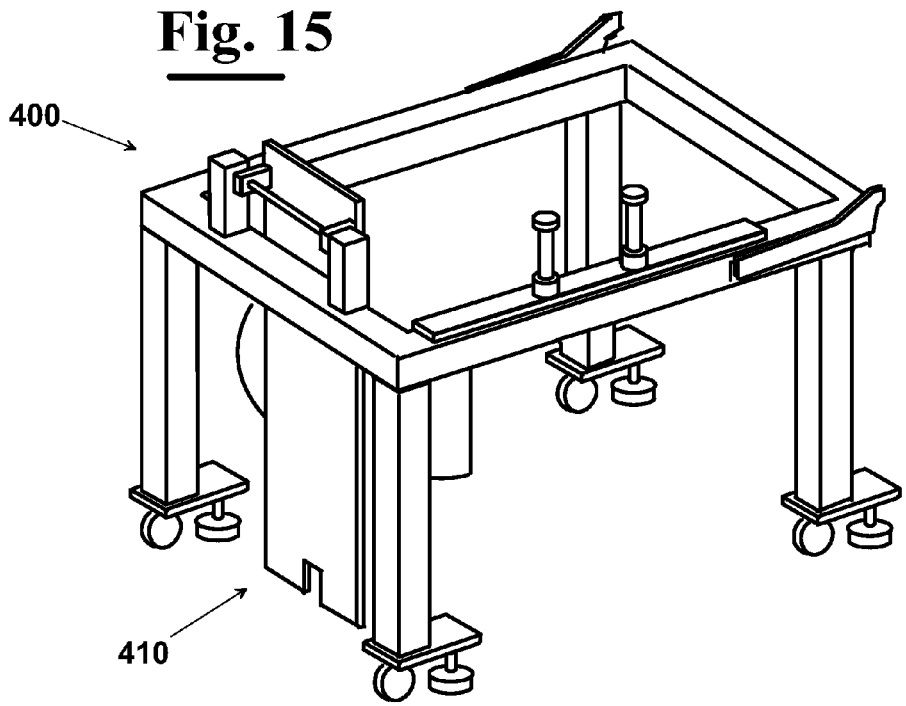
FIGS. 15 to 18 show perspective views of further innovative aspects provided in some exemplary embodiments of the machine of FIG. 1.

In the exemplary embodiment of FIG. 15 inspection device 250 comprises a first and a second inspection windows with elongated shape 251 and 252 arranged substantially parallel and that extend substantially along the whole length of hollow body 10.

Figure 12B:
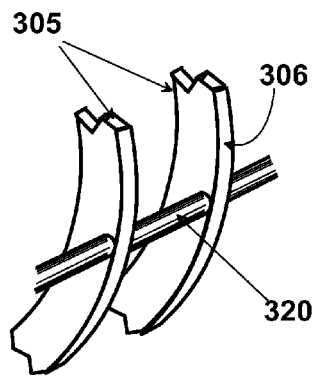
FIG. 12B shows a perspective view of detail a sieve cage according to the present invention.
Figure 20:
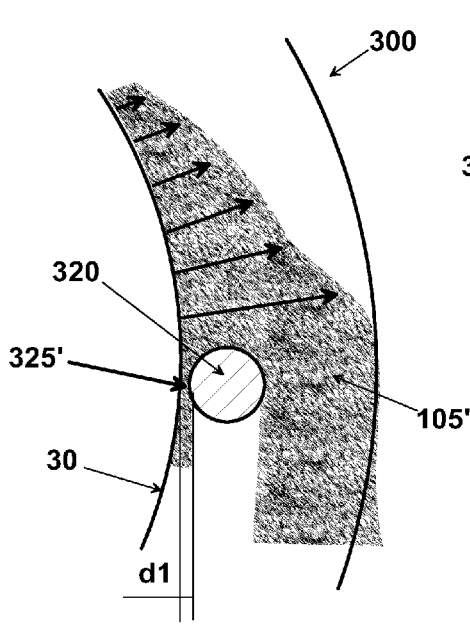
FIG. 20 diagrammatically shows the distance set between a connecting portion and the sieve in a machine for the prior art.
Figure 21:
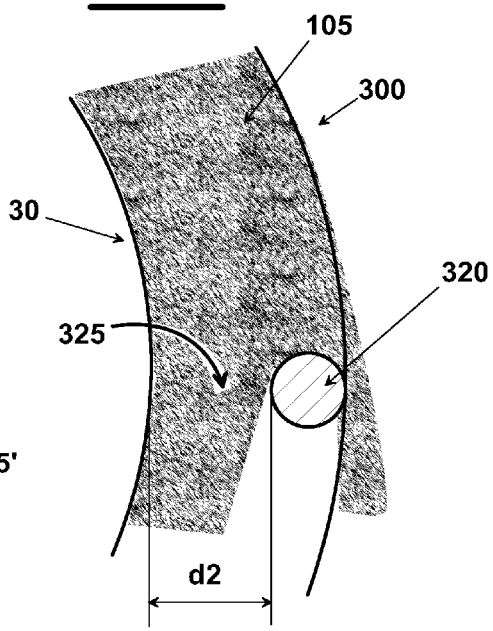
FIG. 21 diagrammatically shows the distance set between a connecting portion and the sieve in a machine, according to the present invention.

In particular, if sieve cage 300 is made as described above, with reference to FIGS. 12 and 14, i.e. with the connecting portions 320', 320" and 320''' substantially "level" with the outer edge 306 of ring portions 305, the surface of sieve 30 is arranged at a distance d2 higher than the distance d1 at which the connecting portions 305 in the prior art machines are arranged (FIGS. 13, 14, 20 and 21).

More in detail, in the prior art machines (FIG. 20), the section passage 325' between sieve 30 and connecting portions 320 is extremely narrow, usually about 6-8 mm and, therefore, the amount of product extracted 105' that can accumulate in space 325' between them is relatively low. Then, the energy of the extracted product 105', i.e. the puree, or the juice, which flows along the surface of sieve 30 going from the highest portion 30' to the lowest portion 30" (FIG. 19) is enough to exceed the obstacle shown by the connecting portions 320 before being discharged from the machine through the first outlet.

Figure 19:
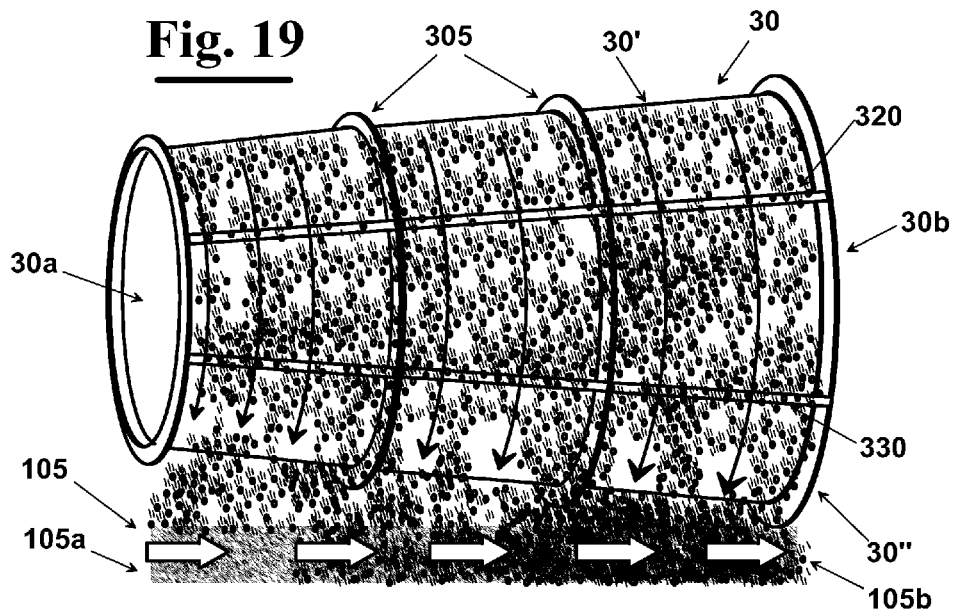
FIG. 19 diagrammatically shows an elevational side view of a sieve cage of a machine, according to the invention, in operating conditions.

Instead, if sieve cage 300 is made with the connecting portions 320", 320''' "level" with the edge 306 of ring portions 305, the connecting portions 320", 320''' are at a distance from the sieve of about 2-3 cm (FIG. 21). Therefore, the amount of product extracted 105 that accumulates in space 325 comprised between them is higher than the previous case. Then, the risk is high of having an obstruction of product 105 especially in the end portion of sieve 30b, where the product extracted has a density higher than the initial portion 30a (FIG. 19).

As well known, in fact, during the movement of the treated product 105 along hollow body 10, the product 105 gradually extracted has increasing density, since always richer of fibres. More in detail, the fraction of product 105a that is extracted initial portion 30a of sieve 30 is much more liquid, whereas as the product 105 moves along the extraction section also the more fibrous parts are extracted and therefore the extracted product 105b in the end portion 30b of sieve 30 is similar to a "paste". Therefore, at end portion 30b of sieve 30, where the average density of the extracted product 105 is higher than in the initial portion 30a, the extracted product 105 can accumulate in the gap 325 between sieve 30 and connecting portions 320", 320''' causing a stay of extracted main product. This requires a maintenance stop for removing the product from the space set between sieve and connecting portions 320", 320''' and restoring normal operating conditions.

If sieve cage 300 is made with connecting portions 320', 320" and 320''' very far from sieve 30, then the technical problem arises of monitoring the correct operation of the machine along all the length of hollow body 10 and, in particular at the above described sections to pass 325 between connecting portions 320" and 320''' and sieve 30.

In the further exemplary embodiment of FIGS. 22 to 25, a machine for extraction of juice, or puree, by a product of animal or vegetable origin, has a sieve cage 300 comprising a first plurality of ring portions 305a arranged in a first sieve section 30a at a first pitch p1, a second plurality of ring portions 305b arranged at a second sieve section 30b at a second pitch p2, with p2>p1. More in detail, the second sieve section 30b is the sieve section 30 farthest from the inlet of the product to treat in machine 1, whereas the first sieve section 30a is the sieve section 30 closest to the entrance of the product to treat. As diagrammatically shown in FIGS. 22 and 23 a third plurality of ring portions 305c can be provided, which is arranged at a third sieve section 30c located between the first sieve section 30a and the second sieve section 30c. Ring portions 305c of the third plurality are, in particular arranged with a third pitch p3, with p1<p3<p2.

Figure 25:
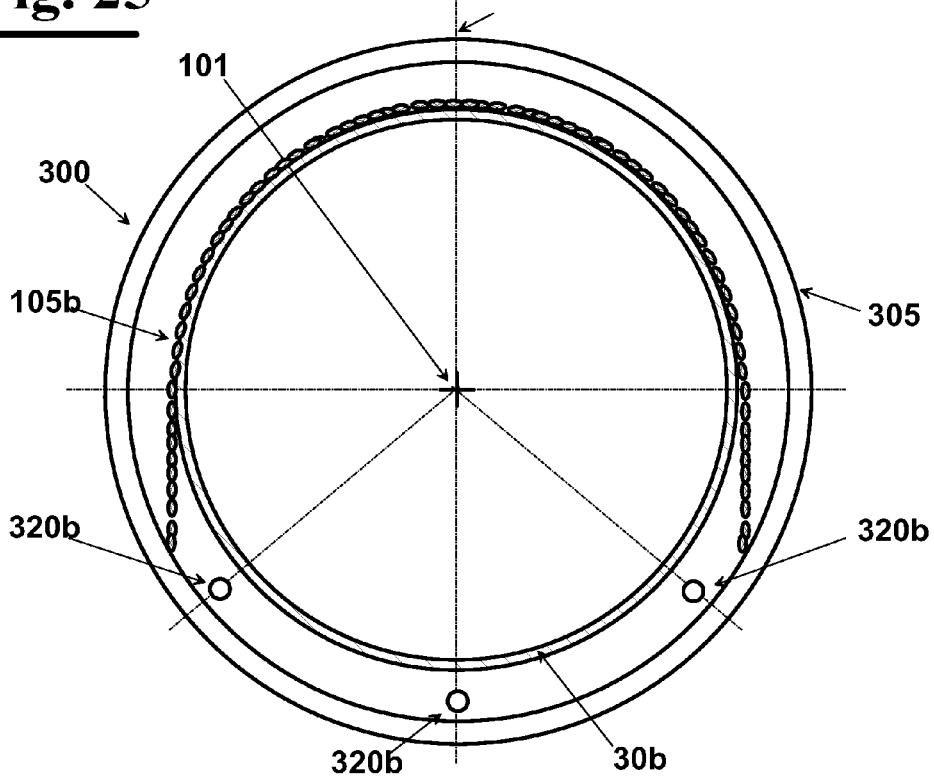

This structure of sieve cage 300 assists a sliding of the extracted product 105b on the surface of sieve 30 at the portion of sieve 30b closest to the outlet of the extraction section (FIG. 25). Notwithstanding already described with reference to FIGS. 19 to 21, in fact, the extracted product 105b in the sieve section 30b is much thicker of the extracted product 105a of sieve section 30a. As said above, this occurs for gradual enrichment in the fibrous fraction of the product travelling from the sieve section 30a, closest to the entrance of the product to treat, towards the sieve section 30b farthest from the inlet of the product to treat.

To avoid that, owing to the larger distance between ring portions 305b, they can deform for high actions to which they are subjected in operating conditions, and, in particular the high lateral friction, ring portions 305b of the sieve section 30b have a thickness s2 higher than the thickness s1 of ring portions 305a of the portion of sieve 30a closest to the entrance of the product in the machine. If a third cross section 30c is provided located between the first and the second sieve section 30a, 30b, has a thickness s3 of ring portions 305c which has a value intermediate between the thickness s1 of sieve section 30a and the thickness s2 of sieve section 30b. This way, ring portions 305b of sieve section 30b and ring portions 305c of sieve section 30c are stiffened enough to avoid deformation owing to the above described actions gradually increasing from sieve section 30a closest to the entrance of the product towards sieve section 30b farthest from it.

Figure 24:
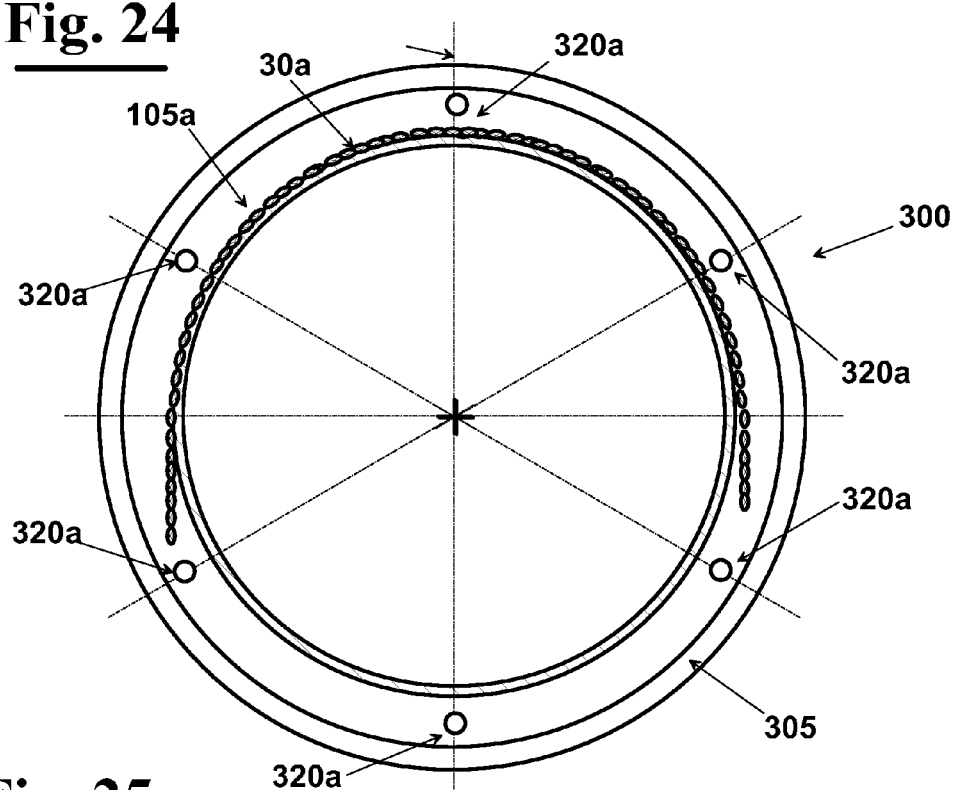
FIGS. 24 and 25 diagrammatically show an elevational front view of the ring portions of two different sections of the sieve cage shown in FIGS. 22 and 23.

As shown in detail in FIGS. 24 and 25, furthermore, the connecting portions 320 can be provided in angular positions and in different number according to the sieve section 30 in which they are arranged.

For example, connecting portions 320a of sieve section 30a, where the extracted product 105a is much more liquid, can be in higher number, for example six connecting portions 320a, which are arranged each at 60° (FIG. 24), whereas the connecting portions 320b of the sieve section 30b, where the extracted product 105b is much thicker, can be arranged only in the low part of sieve cage 300 (FIG. 25). This way, it is possible to assist the sliding of the extracted product 105b along the surface of sieve 30 reducing remarkably the risk of having a jamming of the product 105b between sieve 30 and sieve cage 300 as described above with reference to FIGS. 19 and 21.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A machine for extracting puree, or fruit juice, from a food product of animal or vegetable origin, said machine comprising:
    a hollow body having a longitudinal axis and defined laterally by a lateral containing wall;
    a sieve having a plurality of holes and mounted in the hollow body in a position co-axial to the longitudinal axis;
    a rotor mounted in the sieve in a position co-axial to the longitudinal axis, the rotor having a plurality of blades and arranged to rotate in the sieve to cause a centrifugal force to the food product to be treated, in order to separate the food product to be treated into a main product comprising said puree, or fruit juice, which crosses the plurality of holes of the sieve and is discharged through a first outlet, and a waste material that, instead, cannot cross the plurality of holes of the sieve and is discharged through a second outlet;
    a distributor integral to the hollow body and arranged to receive the food product and to distribute the food product to the rotor;
    a support means arranged at a second portion for supporting the hollow body in a cantilever-like manner;
    a support frame of the sieve, to which the sieve is integral, the support frame of the sieve surrounding the sieve and comprising a plurality of coaxial ring portions and a predetermined number of connecting portions arranged to connect the plurality of coaxial ring portions to each other;
    wherein each connecting portion is arranged flush with an outer edge of the plurality of coaxial ring portions, to avoid producing stairs between the outer edge of the plurality of coaxial ring portions and each connecting portion; and
    a carriage for handling the support frame and the sieve integral to each other, the carriage having a plane support configured to be positioned at a same height of the distributor, in order to allow extracting by sliding the support frame from the hollow body, and arranging by sliding the support frame on the plane support.

2. The machine according to claim 1, wherein the distributor provides a first feeding duct to feed the food product to be treated to the rotor along a first feeding direction, and a second feeding duct to feed the food product to be treated to the rotor along a second feeding direction, wherein the first feeding direction and the second feeding direction are tangential to the distributor.

3. The machine according to claim 2, wherein the first and second feeding ducts are configured to feed the food product to be treated along a direction concordant to the peripheral rotation of the rotor about the longitudinal axis.

4. The machine according to claim 1, wherein a first feeding duct and a second feeding duct are arranged at diametrically opposite positions with respect to the longitudinal axis.

5. The machine according to claim 1, wherein the sieve is integral to a containing wall of the hollow body, wherein an adjustment group is provided for adjusting a relative position between the sieve and the rotor, the adjustment group comprising a force application structure arranged to apply a predetermined correction force Fc on the lateral containing wall at a predetermined position positioned at a predetermined distance d from the support means, the predetermined correction force Fc arranged to cause a predetermined controlled movement of the lateral containing wall and, accordingly, of the sieve, which is integral to the lateral containing wall.

6. The machine according to claim 5, wherein the force application is selected from the group consisting of:
    a first force application structure arranged to apply a first correction force Fc1 on the lateral containing wall of the hollow body, the first correction force Fc1 being orthogonal to the longitudinal axis of the hollow body and being arranged to cause a controlled vertical movement of the sieve, said first force application structure arranged to apply the first correction force Fc1 vertical at a first application point at a lowermost position of the hollow body;
    a second force application structure arranged to apply a second correction force Fc2 on the lateral containing wall of the hollow body, the second correction force Fc2 being horizontal and being arranged to cause a controlled movement horizontal of the sieve, the second force application structure arranged to apply the second correction force Fc2 horizontal at a second application point;
    and a combination thereof.

7. The machine according to claim 5, wherein the force application structure comprises:
    a nut screw element integral to the lateral containing wall of the hollow body;
    a screw arranged to engage with said nut screw element for applying a correction force Fc on the lateral containing wall of the hollow body.

8. The machine according to claim 5, wherein the support means is arranged at a connection flange connecting the first portion and the second portion of the hollow body, the connection flange being weakened, by a reduction of thickness, in order to increase an elasticity and to reduce a stress generated at the connection flange during the relative position between the sieve and the rotor.

9. The machine according to claim 1, comprising:
    a plurality of rotors mounted coaxially in the hollow body; and/or
    a plurality of sieves mounted coaxially in the hollow body.

10. The machine according to claim 1, wherein the first and the second feeding ducts are horizontal, wherein both the first feeding direction and the second feeding direction are horizontal.

11. The machine according to claim 1, wherein the distributor provides:
    a first feeding duct;
    a second feeding duct; and
    a third feeding duct;

said first, second, and third feeding ducts arranged at an angular distance of 120°.

12. The machine according to claim 1, wherein said distributor and the hollow body are configured to engage with each other in a removable way, in order to carry out a replacement of a first distributor with a second distributor different from the first distributor.

13. A machine for extracting puree, or fruit juice, from a food product of animal or vegetable origin, said machine comprising:
a hollow body having a longitudinal axis and defined laterally by a lateral containing wall;
a sieve having a plurality of holes and mounted in the hollow body in a position co-axial to the longitudinal axis;
a rotor mounted in the sieve in a position co-axial to the longitudinal axis, the rotor having a plurality of blades and arranged to rotate in the sieve to cause a centrifugal force to the food product to be treated, in order to separate the food product to be treated into a main product comprising said puree, or fruit juice, which crosses the plurality of holes of the sieve and is discharged through a first outlet, and a waste material that, instead, cannot cross the plurality of holes of the sieve and is discharged through a second outlet;
a distributor integral to the hollow body and arranged to receive the food product and to distribute the food product to the rotor;
a support means arranged at a second portion for supporting the hollow body in a cantilever-like manner;
a support frame of the sieve, to which the sieve is integral, the support frame of the sieve surrounding the sieve and comprising a plurality of coaxial ring portions and a predetermined number of connecting portions arranged to connect the plurality of coaxial ring portions to each other;
wherein each connecting portion is arranged flush with an outer edge of the plurality of coaxial ring portions, to avoid producing stairs between the outer edge of the plurality of coaxial ring portions and each connecting portion;
wherein the support frame comprises:
a first plurality of coaxial ring portions arranged in a first sieve section at a first pitch p1;
a second plurality of coaxial ring portions arranged at a second pitch p2, with p2>p1, at a second cross section of the sieve, the second cross section of the sieve being farthest from the first cross section of the sieve starting from an inlet through which the food product to be treated is put in said hollow body.

14. A machine for extracting puree, or fruit juice, from a food product of animal or vegetable origin, said machine comprising:
a hollow body having a longitudinal axis and defined laterally by a lateral containing wall;
a sieve having a plurality of holes and mounted in the hollow body in a position co-axial to the longitudinal axis;
a rotor mounted in the sieve in a position co-axial to the longitudinal axis, the rotor having a plurality of blades and arranged to rotate in the sieve to cause a centrifugal force to the food product to be treated, in order to separate the food product to be treated into a main product comprising said puree, or fruit juice, which crosses the plurality of holes of the sieve and is discharged through a first outlet, and a waste material that, instead, cannot cross the plurality of holes of the sieve and is discharged through a second outlet;
a distributor integral to the hollow body and arranged to receive the food product and to distribute the food product to the rotor;
a support means arranged at a second portion for supporting the hollow body in a cantilever-like manner;
a support frame of the sieve, to which the sieve is integral, the support frame of the sieve surrounding the sieve and comprising a plurality of coaxial ring portions and a predetermined number of connecting portions arranged to connect the plurality of coaxial ring portions to each other;
wherein each connecting portion is arranged flush with an outer edge of the plurality of coaxial ring portions, to avoid producing stairs between the outer edge of the plurality of coaxial ring portions and each connecting portion;
wherein the hollow body has an inspection device arranged to allow monitoring an inside of the hollow body, and testing the correct operation of the different mechanical parts; and
wherein the inspection device comprises a first inspection window and a second inspection window arranged at a predetermined distance from each other, wherein a light source is arranged at said first inspection window, and wherein the light source illuminates the inside of the hollow body, which is visible through said second inspection window.

* * * * *